United States Patent
Smucker

(10) Patent No.: US 10,561,082 B2
(45) Date of Patent: Feb. 18, 2020

(54) SUBSURFACE BARRIER RETENTION SYSTEM AND METHODS RELATED THERETO

(71) Applicant: Board of Trustees of Michigan State University, East Lansing, MI (US)

(72) Inventor: Alvin J. M. Smucker, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 15/460,196

(22) Filed: Mar. 15, 2017

(65) Prior Publication Data
US 2017/0181391 A1 Jun. 29, 2017

Related U.S. Application Data

(62) Division of application No. 13/879,375, filed as application No. PCT/US2011/056173 on Oct. 13, 2011, now Pat. No. 9,615,518.

(60) Provisional application No. 61/392,785, filed on Oct. 13, 2010.

(51) Int. Cl.
| | |
|---|---|
| *A01G 27/02* | (2006.01) |
| *A01G 25/00* | (2006.01) |
| *A01G 29/00* | (2006.01) |
| *E02F 5/02* | (2006.01) |

(52) U.S. Cl.
CPC ............ *A01G 27/02* (2013.01); *A01G 25/00* (2013.01); *A01G 29/00* (2013.01); *E02F 5/02* (2013.01)

(58) Field of Classification Search
CPC ........ A01G 27/02; A01G 25/00; A01G 29/00; E02B 13/00
USPC .................................................. 405/38, 176
See application file for complete search history.

(56) References Cited

U.S. PATENT DOCUMENTS

| | | | |
|---|---|---|---|
| 3,339,369 A | 7/1967 | Ralph | |
| 3,398,542 A | 8/1968 | Hansen et al. | |
| 3,405,528 A | 10/1968 | Hansen et al. | |
| 3,405,529 A | 10/1968 | Hansen et al. | |
| 3,585,804 A | 6/1971 | Sramek | |
| 3,590,588 A | 7/1971 | Draper et al. | |
| 3,916,565 A | 11/1975 | Runyon | |
| 4,047,387 A | 9/1977 | Tamura et al. | |
| 4,073,152 A | 2/1978 | Kishitani et al. | |
| 4,098,089 A | 7/1978 | Zaslavsky et al. | |

(Continued)

FOREIGN PATENT DOCUMENTS

| | | |
|---|---|---|
| AU | 2011316036 B2 | 10/2011 |
| CA | 1304975 C | 7/1992 |

(Continued)

OTHER PUBLICATIONS

Office Action received for Israel Patent Application No. 225692, dated Mar. 23, 2016, 3 pages.

(Continued)

*Primary Examiner* — Carib A Oquendo
(74) *Attorney, Agent, or Firm* — Westman, Champlin & Koehler, P.A.

(57) ABSTRACT

A subsurface retention barrier system installed in situ to retain water in a projected root zone of one or more plants is disclosed. An apparatus and system for installing the subsurface retention barriers and methods related thereto are also disclosed.

27 Claims, 16 Drawing Sheets

(56) References Cited

U.S. PATENT DOCUMENTS

| | | | |
|---|---|---|---|
| 4,154,549 A | 5/1979 | Zaslavsky et al. | |
| 4,200,410 A | 5/1980 | Baker et al. | |
| 4,379,655 A | 4/1983 | Brost et al. | |
| 4,397,585 A | 8/1983 | Fouss et al. | |
| 4,478,710 A | 10/1984 | Smucker et al. | |
| 4,666,337 A | 5/1987 | Pinto | |
| 4,832,531 A | 5/1989 | Paulovits | |
| 4,838,734 A | 6/1989 | Pinto | |
| 5,025,736 A | 6/1991 | Anderson | |
| 5,060,420 A | 10/1991 | Bergman | |
| 5,736,209 A * | 4/1998 | Andersen | B05B 11/0037 428/152 |
| 5,915,878 A | 6/1999 | Carpenter | |
| 5,949,373 A | 9/1999 | Eslambolchi et al. | |
| 6,053,665 A | 4/2000 | Richardson | |
| 6,070,673 A * | 6/2000 | Wendte | A01B 79/005 172/2 |
| 6,083,586 A * | 7/2000 | Andersen | B29C 43/22 106/206.1 |
| 6,377,881 B1 | 4/2002 | Mullins | |
| 6,959,655 B1 | 11/2005 | Gibson | |
| 9,615,518 B2 | 4/2017 | Smucker | |
| 2008/0153958 A1 | 6/2008 | Ding et al. | |
| 2008/0159812 A1 | 7/2008 | Joly | |
| 2010/0239372 A1 | 9/2010 | Garcia de Alba Flores et al. | |
| 2013/0209172 A1 | 8/2013 | Smucker | |

FOREIGN PATENT DOCUMENTS

| | | |
|---|---|---|
| FR | 2536241 A1 | 5/1984 |
| FR | 2706234 A1 | 12/1994 |
| FR | 2882377 A1 | 8/2006 |
| JP | 2002-1467 59 A | 5/2002 |
| JP | 2003-111528 A | 4/2003 |
| JP | 2010-189859 A | 9/2010 |
| WO | 1987/05646 A1 | 9/1987 |
| WO | 8705646 A1 | 9/1987 |
| WO | 2012/024753 A1 | 3/2012 |
| WO | 2012/051430 A2 | 4/2012 |
| WO | 2012/051430 A3 | 7/2012 |

OTHER PUBLICATIONS

Office Action received for Mexico Patent Application No. MX/a/2013/004017, dated Jan. 21, 2016, 6 pages.
Office Action received for Mexico Patent Application No. MX/a/2013/004017, dated Jul. 12, 2016, 3 pages.
Communication Pursuant to Article 94(3) EPC received for European Patent Application No. 11833418.4, dated Dec. 4, 2015, 4 pages.
Notice of Acceptance Received for Australian Patent Application No. 2011316036, dated Dec. 24, 2015, 2 pages.
First Examiner Report Received for Australia Patent Application 2011316036, dated Sep. 11, 2014, 8 pages.
Second Examiner Report received for Australian Patent Application No. 2011316036, dated Oct. 27, 2015, 4 pages.
Office Action received for Mexican Patent Application No. MX/a/2013/004017, dated Jun. 24, 2015, 4 pages (English Translation Only).
First Official Notification received for Israel Patent Application No. 225692, dated Jul. 8, 2015, 3 pages (Official Copy Only).
Office Action received for Canadian Patent Application No. 2812716, dated Sep. 11, 2015, 4 pages.
Communication pursuant to Article 94(3) EPC received for European Patent Application No. 11833418.4, dated Mar. 16, 2015, 4 pages.
Extended European Search Report Received for EP Patent Application No. 11833418.4, dated May 22, 2014, 8 pages.
International Search Report and Written Opinion received for PCT Patent Application No. PCT/US2011/056173, dated May 31, 2012, 10 pages.
Broll et al., "Topsoil Characterization—Recommendations for Revision and Expansion of the FAO-Draft (1998) with Emphasis on Humus Forms and Biological Features", Journal of Plant Nutrition and Soil Science, vol. 169, No. 3, Jun. 2006, pp. 453-461.
Erickson et al., "The Influence of Subsurface Asphalt Barriers on the Water Properties and the Productivity of Sand Soils", Asphalt Layers, Michigan State University, Agricultural Experiment Station, 1969, pp. 331-337.
Garrity et al., "Percolation Barriers Increase and Stabilize Rainfed Lowland Rice Yields on Well Drained Soil", Proceedings of International Workshop on Soil and Water Engineering for Paddy Field Management, Asian Institute of Technology, 1992, pp. 413-421.
Lobell et al., "Prioritizing Climate Change Adaptation Needs for Food Security in 2030", Science, vol. 319, No. 5863, Feb. 1, 2008, pp. 607-610.
Palta et al., "Effect of an Asphalt Barrier on Water Storage and Drought Probability", Agronomy Journal, vol. 66, No. 2, Mar.-Apr. 1974, pp. 209-212.
Communication pursuant to Article 94(3) EPC received for European Patent Application No. 11833418.4, dated Feb. 17, 2017, 5 pages.
Advisory Action received for U.S. Appl. No. 13/879,375, dated Jan. 6, 2016, 3 pages.
Final Office Action received for U.S. Appl. No. 13/879,375, dated Sep. 2, 2015, 10 pages.
Non Final Office Action received for U.S. Appl. No. 13/879,375, dated Apr. 7, 2016, 8 pages.
Non Final Office Action received for U.S. Appl. No. 13/879,375, dated Jan. 16, 2015, 10 pages.
Restriction Requirement received for U.S. Appl. No. 13/879,375, dated Aug. 8, 2014, 6 pages.
First Examination Report received for Australian Patent Application No. 2016202365, dated Mar. 2, 2017, 4 pages.
Communication under Rule 71(3) EPC Received for EP Application 11833418.4, dated Nov. 7, 2017, 6 pages.
Communication pursuant to Article 97(1) EPC received for EP Application No. 11833418.4, dated Jun. 14, 2018, 2 pages.
Communication under Rule 71(3) EPC received for EP Application No. 11833418.4, dated Apr. 30, 2018, 6 pages.
Office Action received for Canada Patent Application No. 2,899,383, dated Jan. 15, 2018, 5 pages.
First Examination Report received for Indian Patent Application No. 4019/DELNP/2013, dated May 30, 2018, 6 pages.
Notice of Allowance Received for Canadian Patent Application No. 2,899,383, dated Jul. 12, 2018, 1 page.

* cited by examiner

SUBSURFACE BARRIER RETENTION SYSTEM AND METHODS RELATED THERETO

This application is a divisional of U.S. patent application Ser. No. 13/879,375, filed on Apr. 12, 2013, now issued as U.S. Pat. No. 9,615,518, which application is a U.S. National Stage Filing under 35 U.S.C. 371 from International Application No. PCT/US2011/056173, filed on Oct. 13, 2011 and published in English as WO 2012/051430 on Apr. 19, 2012, which application claims benefit under 35 U.S.C. 119 (e) of U.S. Provisional Application Ser. No. 61/392,785 filed on Oct. 13, 2010, now abandoned, which applications and publications are hereby incorporated by reference in their entireties.

BACKGROUND

A challenge facing the global community is the availability of high quality water, such as for food and fiber production and industrial and domestic uses. This challenge cannot be totally resolved by drilling more wells, desalinating sea water, or building more dams and irrigation canals for transporting retained water to distant locations such as dry fields. Accordingly, there is a need to artificially better retain water near crop root zones.

SUMMARY

In one embodiment, a system for installing a subsurface retention barrier (SRB) is provided comprising one or more barrier installation devices connectable to a forward moving device, wherein each of the one or more barrier installation devices have a film chamber configured to fold a film to form a folded curvilinear films, to bend the folded curvilinear film to form a bended and folded curvilinear film and to open the bended and folded curvilinear film to form a curvilinear film oriented for deposition into a medium in a projected root zone below the surface; and a guidance system in communication with the forward moving device, the guidance system for positioning each of the SRBs in a particular position configured to maximize retention in the SRB.

In some embodiments, the forward moving device is a tractor, the medium is soil, and the guidance system is a global positioning satellite system, and the curvilinear film can be installed at multiple soil depths in a continuous fashion with minimal disturbance to the surface.

In some embodiments, the guidance system further includes a depth control wheel connected to the one or more barrier installation devices (BIDs), further wherein each of the SRBs retain about 180% to about 300% more water as compared in the projected root zone as compared to a root zone without a SRB.

In one embodiment, an apparatus for installing a SRB is disclosed comprising an implement having a sweep configured to pass through a medium to temporarily lift the medium to define a cavity therein, the implement configured to dispose a film in the cavity, wherein the implement has a film folding chamber with a curvilinear film entrance configured to fold the film and a folded film transfer chamber contiguous with the film folding chamber for receiving folded film and providing it to a transfer and placement chamber, the transfer and placement chamber having a curvilinear film exit configured to unfold and install the film into a curvilinear trough defining a concave cross section, the trough opening to a surface of the medium, wherein the installed film forms the SRB. A global positioning satellite (GPS) device can also be coupled to the apparatus.

In one embodiment, the curvilinear film entrance is a cordate-shaped entrance such that an apex of the film is aligned toward a direction of travel of the implement, and the curvilinear film exit has a plurality of curved surfaces. In one embodiment, the implement is configured to create the cavity at a preselected depth to permit cultivation of a projected root zone in the soil without disturbing the soil surface. In one embodiment, the SRB is configured to provide retained water to the projected root zone.

In one embodiment, the apparatus can further comprise a film dispenser and a film channel configured to guide the film through the implement. In one embodiment, the film is biodegradable and/or configured to resist one or both of soil meofaunal or root penetration. In some embodiments, one or more portions of the SRB are engineered to be semipermeable in at least one direction.

In one embodiment, a method for installing a SRB beneath a medium surface is provided, which comprises forming a subsurface retention cavity in a medium located beneath the medium surface by temporarily moving the medium; positioning one or more SRBs within the subsurface retention cavity in a configuration for retaining a maximum amount of available liquid; and filling the subsurface retention cavity with the temporarily-removed medium such that the medium surface remains in a substantially undisturbed condition after the installation. In one embodiment, the medium is soil, the SRB is a subsurface water retention barrier installed in a site specific location and the method further comprises determining a barrier installation pattern using crop data.

In one embodiment, the medium is soil and the SRB is a subsurface water retention barrier installed in a site specific location and the method further comprises determining a barrier installation pattern using crop data and filling the trough.

The method can further comprise forming the barrier into a u-shaped barrier having width to height ratio (as measured from the deepest portion of the barrier, i.e., at substantially the centerline of the barrier) of between about 1.5:1 to about 2.5:1 around a projected root zone of one or more plants. In one embodiment, the forming a subsurface cavity comprises dragging an implement, such as a pointed shoe tip, through the soil to define the subsurface cavity to form a concave subsurface cavity that opens to a surface of the soil.

In some embodiments, the method can further comprise determining a depth of the cavity using at least two of precipitation records, water infiltration rate, wind speed, relative humidity, soil temperature, solar radiation, soil type, soil and crop management practices, water management, or plant rooting depths.

In one embodiment, a SRB system is provided which comprises a series of curvilinear barriers installed beneath a projected root zone of a plant to collect and retain nutrients, water, or both, in a manner sufficient to enhance growth of the plant. In one embodiment at least one of the curvilinear barriers is deeper than other curvilinear barriers in the series and/or at least two of the series of curvilinear barriers are in contact with each other.

In various embodiments, the SRB includes a u-shaped reservoir that retains nearly twice the water content of the surrounding naturally drained soils. In various embodiments, soil water reservoirs retain adequate water quantities to reduce both the frequency and severities of short-term water stresses by at least one month (see, e.g., FIG. 15).

On a global basis, there is an estimated 5 billion acres of sandy soil which could benefit from the present subject matter. Food and biomass potential increases could reach 125%. In some embodiments, the novel barrier system and installation method described herein can integrate new drought-tolerant and disease-resistant food and fiber crops that produce 200 to 400% higher yields, while simultaneously conserving water and fertilizers on as many of the 5 billion marginal sandy soils as possible. Hydropedologically contoured barriers can also reduce the deep leaching and undesirable transport of agricultural and industrial toxins, as well as improving water harvesting in arid and semi-arid regions of the world.

DETAILED DESCRIPTION OF THE EMBODIMENTS

Figure 1:
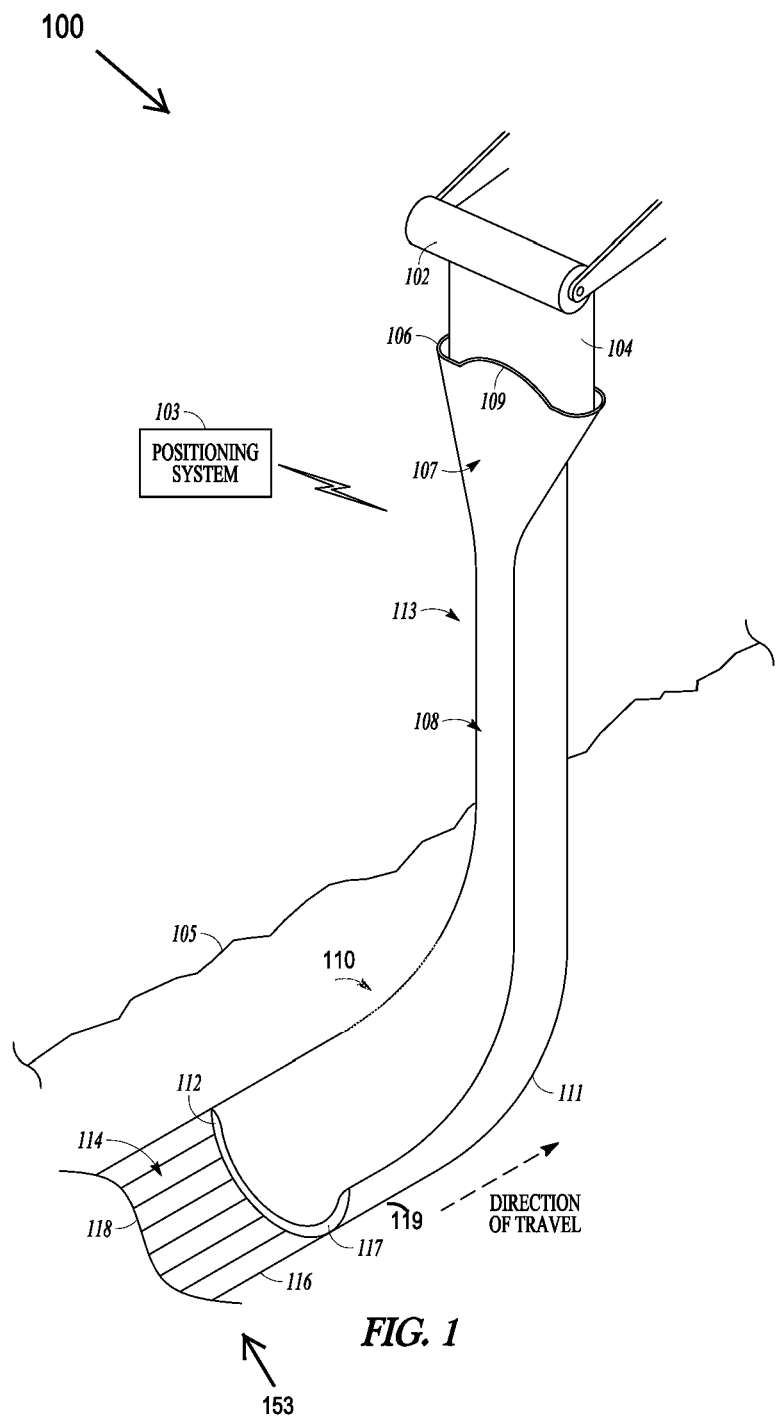
FIG. 1 is a perspective view of a film folding, transfer and placement chamber (FTPC) of a barrier installation device (BID) for folding, transferring, unfolding and placing a subsurface retention barrier (SRB) under a surface according to an embodiment.

In the following detailed description of embodiments of the invention, embodiments are described in sufficient detail to enable those skilled in the art to practice them, and it is to be understood that other embodiments may be utilized and that structural, chemical and procedural changes may be made without departing from the spirit and scope of the present subject matter. The following detailed description is, therefore, not to be taken in a limiting sense, and the scope of embodiments of the present subject matter is defined only by the appended claims.

The Detailed Description that follows begins with a Definition section and an Overview of Water Resources, followed by a Description of the Embodiments, and an Example section followed by a brief Conclusion.

The term "biofuel" or "biomass" as used herein, refers in general to organic matter harvested or collected as a source of energy. Biofuels are originally derived from the photosynthesis process and are therefore considered a solar energy source. A biofuel is a renewable solid, liquid or gaseous fuel derived from relatively "recently" dead biological material, i.e., "biomass," as distinguished from fossil fuels, which are derived from long dead biological material and are not renewable. There are generally considered to be three types of biofuels, namely, agricultural biofuels (defined below), municipal waste biofuels (residential and light commercial garbage or refuse, with most of the recyclable materials such as glass and metal removed) and forestry biofuels (e.g., trees, waste or byproduct streams from wood products, wood fiber, pulp and paper industries). Biomass is in the form of solid biomass, liquid biomass or gaseous biomass, according to several embodiments.

The term "plant biomass" or "ligno-cellulosic biomass" as used herein is intended to refer to virtually any plant-derived organic matter (woody or non-woody) available for energy on a sustainable basis. Plant biomass includes, but is not limited to, agricultural crop waste and residues such as corn stover, wheat straw, rice straw, sugar cane baggase and the like. Plant biomass further includes, but is not limited to, woody energy crops, wood wastes and residues such as trees, including fruit trees, such as fruit-bearing trees, (e.g., apple trees, orange trees, and the like), softwood forest thinnings, barky wastes, sawdust, paper and pulp industry waste streams, wood fiber, and the like. Additionally grass crops, such as various prairie grasses, including prairie cord grass, switch grass, big bluestem, little bluestem, side oats grama, and the like, have potential to be produced large-scale as additional plant biomass sources. For urban areas, potential plant biomass feedstock includes yard waste (e.g., grass clippings, leaves, tree clippings, brush, etc.) and vegetable processing waste. Plant biomass is known to be the most prevalent renewable form of carbohydrate available in nature and corn stove is currently the largest source of readily available plant biomass in the United States.

The term "surface" as used herein refers to an uppermost surface of a medium which can be liquid or solid. The surface of a liquid medium can be a solid, liquid or a combination thereof. The surface of a solid medium can be solid, liquid, or a combination thereof. A solid surface can be, for example, an in situ soil surface or an in situ soil matrix surface.

The terms "subsurface" as used herein, refer to any location beneath, i.e., below, a surface. If the surface is an in situ soil surface or an in situ soil matrix surface located on a planet's surface, i.e., on the "ground," such a location is considered to be a "shallow underground" which is within the topsoil at a depth beneath a projected plant root zone, although not so deep as to be in the "subsoil," i.e., the layer of soil under the agricultural topsoil.

The term "soil" as used herein, refers to a solid medium, i.e., granular material comprising a biologically active, porous medium. Soil is found on, or as part of, the uppermost surface of the Earth's crust and evolves through weathering of solid materials, such as consolidated rocks, sediments, glacial tills, volcanic ash, wind and water deposited minerals and organic matter. Such a soil can include a highly porous and permeable mineral soil, including, but not limited to, Oxisols, Alfasols and sandy soil (i.e., "sand"). Sandy soils are further characterized by a highly permeable "coarse" texture as the term is understood in the art.

The term "soil matrix" as used herein, refers to any plant growth medium which can include a combination of materials.

The term "root zone" as used herein refers to that portion of a medium which can be penetrated by plant roots. A projected root zone is the maximum root zone expected for a given plant type.

The term "subsurface retention barrier" or "SRB" refers to a barrier disposed under a surface, such as underground in soil or a soil matrix. The barrier can be porous, impermeable or partially impermeable to liquid and is useful for water and/or nutrient retention. When installed on a planet's surface, the barrier is located beneath and proximate to a projected root zone.

The term "chisel sweep surface" or "chisel sweep" as used herein refers to a surface which curves from one direction to another along its length. Such a curve may be as small as 10 degrees, up to 180 degrees or more, including any range there between. The curve may be between about 80 and 100 degrees, including any range there between.

The term "film" as used herein refers to a thin material or membrane capable of at least partially retaining liquid.

The term "nutrients" as used herein refers to plant nutrients which include both mineral (primary and secondary macronutrients and micronutrients) and non-mineral nutrients.

Current global usage of fresh water averages about 70% for food and fiber production, about 20% for industrial activities, and about 10% for municipal and domestic consumption. Large quantities of the water accounted for in the production of food and fiber is wasted due to poor water retention by sandy and marginally sandy soils. It has been estimated that sandy soil regions require from about 7 to 17 times more water than is actually used to produce maximum food and fiber yields. Similarly, it has been estimated that sandy soil regions retain less than 10% of rainfall in the root zone between the soil surface and 60 to 70 centimeters (cm) below the soil surface, with the remaining water draining beyond most root configurations, leaching most plant nutrients and pesticides to depths beyond the roots of food and forage crops.

Human population growth and the distribution of population centers stress water resources worldwide, in both developed and developing nations. Continued population growth, especially at or near current population centers, along with variations in the hydrologic cycle related to climate change, will continue to stress global water resources.

Soil texture can provide a controlling influence or groundwater quality and quantity. For instance, because precipitation migrates through soil prior to recharging groundwater or outcropping to surface water bodies, water quality is linked to soil quality. Similarly, many issues related to water usage and conservation are linked to water use efficiency in agriculture and to emerging industrial activities in the developing world.

Large areas of land, including more than 23 billion acres of highly permeable soils, are located in arid and semi-arid areas of the world. Due to the porosity of the soil, insufficient quantities of water and/or nutrients are retained in the root zones of most plants to maintain sustainable agriculture and grazing landscapes. These water and nutrient deficiencies can be caused by various conditions such as coarse soil texture, poor soil structure, lack of precipitation, or limited available irrigation. Water deficits reduce agricultural efficiency and food production, and can have detrimental results, especially when affecting underdeveloped parts of the world. Sub-Saharan Africa, for example, experiences some of the most unfavorable climate inconsistency and insufficient soil water availability, shortening its growing season and limiting its agricultural production.

As the population of the world continues to grow, the need for using this marginal land for agricultural purposes becomes more pressing. In many areas, good agricultural land is becoming sufficiently scarce so as to create a need for economical and easily applied methods for reclaiming sandy and other porous soils, which otherwise lack sufficient water retention properties for sustainable agriculture. Michigan, for instance, has over 3 million acres of land having marginally sandy soil.

The growing world population also faces the issue of a depleting supply of high quality water. Rapid drainage of rainwater through soil requires large quantities of water for maintaining agricultural production and causes irregularities in the hydrologic cycle. Furthermore, food supplies are becoming less sufficient in feeding the growing population, creating more competition for the water needed to grow crops.

Current attempts to provide subsurface barriers have failed to address these issues. For example, asphalt barriers were developed to eliminate water percolation to depths below the root zone. However, these barriers also limit root growth through and below the subsurface soils. Additionally, during excessive rainfall, lower regions of the root zone can become saturated, resulting in root diseases and death. Additionally, since the asphalt barriers limit root growth below the barrier, plants can easily become water stressed during prolonged periods between rainfall and/or supplemental irrigation events.

Yet other types of barriers require manual or machine removal of surface soils before a barrier or barrier system, e.g., asphalt soaked cloth, layers of plant debris or clay materials can be inserted and recovered with the above top soil.

Yet other systems for installing flat "strips" of plastic at various soil depths are devoid of retaining sides or otherwise have sides of such a minimal height i.e., an aspect ratio or width to height ratio of less than 1:4, such as 1:5 or more, such that retention of water (as well as nutrients and pesticides) is quite minimal due to excessive water losses to surrounding soil by gravity and/or capillary action. Such systems have little or no impact on plant growth.

Yet other attempts include systems with no ability to control precise location and depth. As a result, such systems are prone to installing barriers improperly, including too far above (too shallow) and/or too far below (too deep, such as in the subsoil) in relation to a projected root zone, as well as too close and/or too far from one another, and the like, all of which can cause a number of undesirable results as discussed herein.

Through use of various embodiments of the subject matter described herein for conserving water resources by retaining water and nutrients in the root zone, much of the marginally sandy land discussed above can become highly productive and capable of generating large quantities of commercially grown products, such as various types of crops useful as cellulosic biomass for biofuels.

In one embodiment, switch grass, corn, soybeans and various fruits and vegetables can be grown on marginally sandy soil with improved water retention capacities ranging to as low as about 40 cm or about $4 \times 10^{-3}$ mega-Pascals (MPa). In one embodiment, the increased water retention capacities at least double the volumes of water retained in the projected root zone, when the subsurface retention barriers (SRBs) are properly positioned beneath the soil surface. In various embodiments, the SRBs described herein, when positioned below a soil surface, can increase food and biomass production by at least 50% and up to about 400% while also providing multiple ecosystem services such as reducing groundwater contamination and greenhouse gas emissions.

One embodiment of the present subject matter includes a SRB which is compatible with a medium into which it is installed, a SRB dispenser for dispensing the SRB, and an implement configured to define a SRB channel, wherein the SRB channel is adapted to guide the SRB and the implement, wherein the implement includes a chisel sweep adapted to pass through a soil to temporarily lift the soil to define a cavity in soil, the cavity having a concave vertical cross section, wherein the implement is adapted to dispose the SRB in the cavity with the SRB having a concave vertical cross-section adapted to retain liquid draining toward the SRB. In one embodiment, the SRB is useful for improving liquid retention in soil.

In various embodiments, one or more SRBs are positionable in situ beneath a soil surface to enhance plant growth without significant disruption of the structure of the soil surface. The SRBs can retain at least a portion of the water present in the soil, making it more readily available to plant roots present beneath the soil surface.

The present subject matter provides, in one embodiment, an implement to insert and form a SRB for retaining water under a soil surface. In various embodiments, the SRB is deposited beneath a soil surface and can reduce groundwater contamination and/or increase moisture content near the soil surface, such as in the root zones of plants. A SRB located under a soil surface can further provide increased food and cellulose production, improved conservation of water resources, decontamination of pesticides, industrial contaminants and endocrine disruptive compounds, improved water quality, and the like. In one embodiment the SRB can contain spatial configurations for internal soil drainage of saturated soil water during excess rainfall and can, in some embodiments, be perforated to varying degrees to promote timely drainage in finer textured soils.

Therefore, in one embodiment a system is provided comprising one or more SRBs, each having a curvilinear configuration and deposited at one or more depths in soil, in combination with a plurality of complementary soil implements for continuously installing the SRB without destroying the surface above. In one embodiment, the system results in a water retention which is about 180% to about 300% higher than control soils without SRBs. Additionally, commercial equipment, designed to accurately install the SRB's includes, in one embodiment one or more guidance systems, such as satellite-based guidance systems, to enable precise application and positioning of subsequent passes (following an initial pass) across fields in the x, y and z positions in a manner that maximizes the functionality of the SRB's.

Surprisingly, and as is demonstrated herein, use of a SRB having a curvilinear configuration, such as a u-shaped configuration (e.g., concave parabolic-shaped, bowl-shaped, contoured, and the like) provides results far superior to SRBs which are non-curvilinear, such as V-shaped barriers, or square-shaped barriers.

Figure 2:
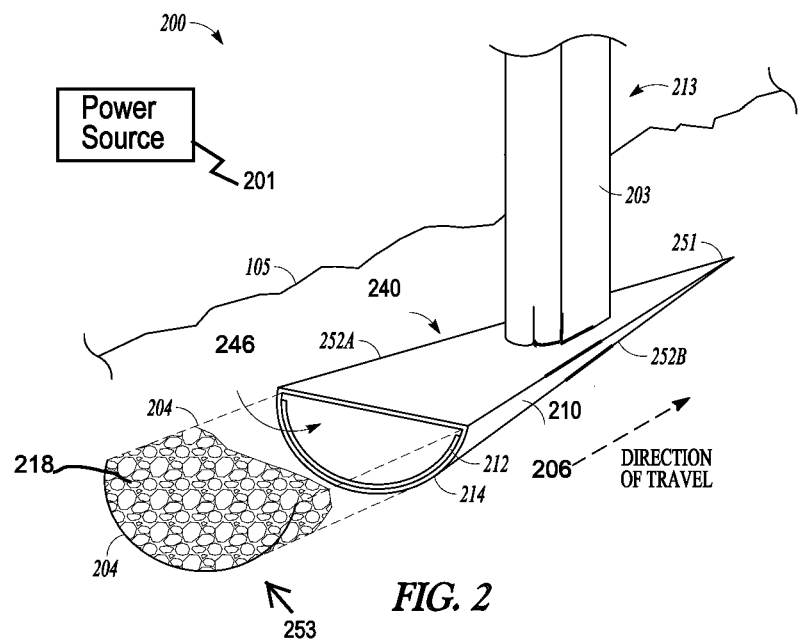
FIG. 2 is a perspective view of a BID with a pointed shoe which surrounds the FTPC of FIG. 1, according to an embodiment.

The embodiment shown in FIG. 1 is a film folding, transfer and placement (FTPC) 113 of a barrier installation device (BID) (See, e.g., FIG. 2). The FTPC 113 is useful for folding a barrier material, such as a film 104 into a folded curvilinear shape, and then unfolding the film 104 into a curvilinear shape and transferring it into a subsurface 114 (represented by contour lines 116, which are sectioned at 118) located beneath a surface 105.

The film 104 moving through the FTPC 113 can be controlled by any suitable means. In one embodiment, the film 104 is connected to any suitable power source (e.g., tractor) capable of causing it to advance through the FTPC 113. In one embodiment, the power source comprises one or more servo motors on a forward moving device, such as a tractor, capable of operating one or more hydraulic cylinders (hereinafter "hydraulics").

The film 104 can be installed at any suitable depth in the medium and the depth of installation can be controlled by any suitable means. The desired depth is dependent on a variety of factors, such as location of projected root zone, medium type, and the like. In most embodiments, one or more depth locators (i.e., an xyz positioning system) are used to properly position the film 104 (vertically and horizontally) within the medium. In the embodiment shown in FIG. 1, a depth locator 103 is used. In one embodiment, the depth locator 103 comprises a wireless positioning system. In one embodiment, the wireless positioning system is a global positioning system (GPS).

In one embodiment, the positioning system includes a touch screen display, such as a color screen display. In one embodiment, the display provides mapping information showing altitude variations of the area, such as by color. Such a positioning system can also have other features, including various user input devices, electronics and software known to those skilled in the art. Such spatial accuracy allows the performance of the SRBs to be maximized by positioning them so precisely under the surface to allow not only water to be collected and retained at the appropriate levels, but to also provide adequate space for roots in the projected root zone and for any excess water to bypass the SRB.

In one embodiment, a GPS is used which is useful with field level surface draining, i.e., a vertical positioning system, as is known in the art. The GPS can rely on any suitable number of satellites. In one embodiment, 7 to 12 satellites are used. Such a positioning system can further include a laser system to improve crop yields through consistent drainage, i.e., a horizontal positioning system for precision row formation, as is also known in the art. In one embodiment, the vertical accuracy (z), i.e., soil depth (z) is within less than about 3 cm, such as within less than about 2.54 cm, such as between about 1 and 2 cm. In one embodiment, the vertical accuracy (z) is at least about 1 cm. In one embodiment, horizontal accuracy (x, y), i.e., directional path, is also within about 1 cm within less than about 3 cm, such as within 1-2 cm. In one embodiment, the horizontal accuracy is at least about 1 cm.

In one embodiment, the depth locator 103 additionally comprises a physical positioning system, such as one or more depth control wheels (e.g., 1161 in FIG. 11) which help to maintain the SRB installation at the desired depth. In one embodiment, an additional component for securing the SRB in place is used, such as one or more press wheels 1173 (e.g., two-sloped closing wheel assembly) or soil levelers 1175 which travel along the surface of the SRB to cover tracks from the forward moving device (e.g., 1151 in FIG. 11) or otherwise close any gaps created in the medium surface by the forward moving device traveling through the medium (e.g., such as chisel standard moving through the soil). In one embodiment, as the SRB is being conformed by press wheels, the overburden soil (soil removed to form the concave-shaped soil cavity) passing across the top of a chisel sweep (e.g., 707 in FIG. 7) falls back on top of the SRB.

Referring again to FIG. 1, in one embodiment, the surface 105 is a soil surface and the FTPC 113 is sized so that the film 104 can be dispensed as it is pulled through the soil. In the embodiment shown in FIG. 1, the FTPC 113 includes a film folding chamber 107, a folded film transfer chamber 108 and a transfer and placement chamber 110. In this embodiment, the FTPC 113 is adapted to transfer the film 104 from a roll 102 into the film folding chamber 107 for transport into the transfer and placement chamber 113 and installation below the surface 105. In this embodiment, the film folding chamber 107 has an opening 106 which is configured to allow the film 104 to be dispensed in the subsurface 114 as a curved non-flat SRB, 153, i.e., a SRB having sidewalls curved in relation to a bottom portion at less than 90 degrees and capable of holding/retaining liquid for an extended period of time (e.g., weeks or months).

In one embodiment, the opening 106 has a plurality of curved surfaces. In the particular embodiment shown in FIG. 1, the opening 106 has a cordate shape, i.e., a heart-shaped outline, such that it is defined, in part, by a cusp 109 located on a first side of the film 104 which is opposite an apex (not shown) located on an opposing second side of the film 104.

In the embodiment shown in FIG. 1, the film folding chamber 107 extends into and is contiguous with the folded film transfer chamber 108. The folded film transfer chamber 108 forms a part of a surface, such as a chisel sweep 111 which, in this embodiment, curves approximately 90 degrees from substantially vertical to substantially horizontal and further includes a bend, such as about a 45 degree bend, that allows the folded film 104 to open upon deposition into the medium 118 as a barrier having a curvilinear configuration. In this way, the FTPC 113 has a three-dimensional J-shape, thus allowing the film 104 to remain folded as it passes through the folded film transfer chamber 108, and open upon exiting from the transfer and placement chamber 110. A frontal area 117 of the folded film transfer chamber 108 can be contiguous with an exit region 112 of the transfer and placement chamber 140 such that an entire frontal area of the FTPC 113 (comprising the exit region 112 and the frontal area 117 of the folded film transfer chamber 108) is reduced in size in the direction of travel.

In the embodiment shown in FIG. 1, the folded film transfer chamber 108 is contiguous with the transfer and placement chamber 110 which itself extends to the exit region 112. The shape of the exit region 112 determines the shape of the film 104 upon installation beneath the surface 105, i.e., the film 104 substantially conforms to the shape of the exit region 112 as it is exiting the FTPC 113.

In one embodiment, a cross-section of an installed film 104 is concave, opening to the surface 105 above. In one embodiment, the cross-section of the film 104 is similar to the cross section of a non-shallow bowl, i.e., bowl-shaped. In one embodiment, the shape of the subsurface 114 is dictated by a base 119 of the chisel sweep 111.

Folding, and then unfolding the film 104 in this manner allows for transport of the film 104 from the roll 102 into a desired position beneath the surface 105 without requiring that a BID 100 to be as wide in the direction of travel as the film 104 is wide.

In one embodiment, the SRB 153 comprised of the film 104 can be covered with the medium into which it is being placed, (see, e.g., FIG. 3) as it is being delivered from the BID 100 in to the subsurface 114.

In some embodiments, the SRB can further be covered with a subsurface tape made of any suitable materials and containing holes which allows collected water to be leaked in a controlled manner into the installed SRB below. Such tape can be particularly useful in arid environments. In one embodiment, a cultivator chisel device is designed to install the subirrigation tape about 2 to about 4 inches (5.1 to 10.2 cm) below a soil surface. In one embodiment, the subsurface tape remains in place for more than one year, such as two to three years, before it is removed and replaced.

The embodiment shown in FIG. 2 is a BID 200 containing a FTPC 213 surrounded by a pointed shoe 240. The BID 200 is attachable to any suitable structure 203 and powered by a suitable power source 201. The BID 200 is compatible with low power applications, such as applications utilizing less than about 180 HP, although the present subject matter is not so limited. In one embodiment the power source 201 is any type of self-powered vehicle, such as other lawn or farm equipment, or one or more animals. In one embodiment, the structure 203 is a cultivator standard and the power source 201 is a tractor.

In various embodiments, drawbars (e.g., 704 in FIG. 7) equipped with multiple BIDs are pulled by one or more animals or tractors. Various embodiments install SRBs across commercial fields. Smaller single BID units, installed using animal power, install SRBs in sandy soils in small farms in developing countries. Additional SRB implements include vertical implements for installing vertical application SRBs such as to protect fresh water sources from contaminated soil plume flow.

Referring again to FIG. 2, the BID 200 has few moving parts which reduce frictional resistance on a film 204 as it passes through the device. In the embodiment shown in FIG. 2, the BID 200 has pointed shoe 240 with a leading edge or tip 251, such as a substantially pointed tip, as shown in FIG. 2. The tip 251 can have any suitable shape as desired for a particular application, such as a curvilinear tip, a squared off tip, and the like. In one embodiment, the tip 251 is replaceable to compensate for wear and/or to provide alternative configurations to vary the size and shape of a cavity in the medium 218 and/or to account for different types (e.g., different textures, particle sizes, range of particle sizes, etc.)

In the embodiment shown in FIG. 2, the pointed shoe 240 extends from the tip 215 to a pointed shoe exit region 214 in a continuously widening curvilinear shape, such as a wedge shape or U-shape. The pointed shoe exit region 214 is disposed along a curvilinear portion 252B of the pointed shoe 240. This pointed shoe exit region 214 can substantially surround the exit region 212 of the BID 200 as shown.

In the embodiment shown in FIG. 2, the pointed shoe 240 has a shape of a "cone-half" or a "sliced cone," i.e., a shape which results when a cone is sliced along its major axis to produce a substantially flat portion 252A and the curvilinear portion 252B. In this embodiment, the substantially flat portion 252A is substantially parallel to and faces the medium surface 105 to allow the medium 218 present below the surface, e.g., soil, to be temporarily suspended, i.e., for a time sufficient to allow a cavity to be created and the barrier to be installed by the BID 200 moving in the direction shown.

In the embodiment shown in FIG. 2 an opening 246 having a plurality of curved surfaces (which can be in addition to the cordate opening in the film folding chamber, e.g., 107 in FIG. 1) is defined within the transfer and installation chamber 210. In use, the film 204 exits the exit portion 206 of the transfer and replacement chamber 210, which also has a plurality of curved surfaces, and unfolds in the widening transfer and placement chamber 210, which can be substantially parallel to the curvilinear portion 252B of the pointed shoe 240.

The film 204 which is deposited in the medium 218 creates a SRB for moisture and/or nutrients and/or other desirable components which improve the quality of the medium and/or enhance plant growth and quality. SRBs which are installed too shallowly in relation to the root zone of the plants above can cause anaerobic conditions to develop over extended periods of time. Such anaerobic conditions develop when the oxygen diffusion rate falls too low in soils containing excess water at or near the SRB. SRBs installed too shallowly, i.e., too close to the lower portion of the root zone, can also cause more oxygen stresses to plant roots as compared to SRBs installed properly, i.e., generally at least a few centimeters up to several centimeters beneath the lower most roots in the root zone, including during periods of excessive rainfall.

Additionally problems of SRBs installed too shallowly include the generation of an excessively low-matric potential water to the soil surface, by capillarity, which readily evaporates. Additionally, during excessive rainfall, the small reservoir capacity of SRBs installed too shallowly can cause flooding, which removes oxygen from root systems for at least 30 hours. Additionally, a "too shallow" SRB can reduce the soil-oxygen diffusion rate. If the soil oxygen diffusion rate decreases to less than about $24 \times 10^{-8}$ g cm-2 min-1, the overall plant health and growth decreases. A too shallow SRB can also become a physical impediment to root growth, thus producing abnormal geometric distributions that interfere with water and nutrient absorption and foster root diseases.

Figure 3:
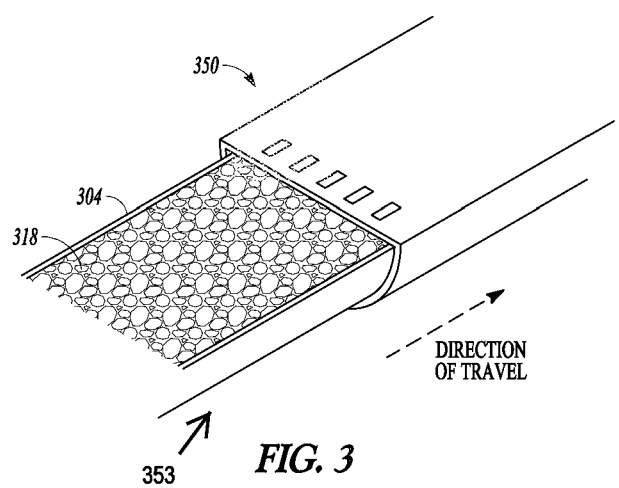
FIG. 3 is a perspective view of the BID of FIG. 2 in use, according to an embodiment.

FIG. 3 shows the device of FIG. 2 in use, according to some embodiments. A film 304 is delivered from the pointed shoe 350 in a curvilinear configuration to form a SRB 353 which is them covered by medium 318. The SRB 353 is installed at a proper depth (in relation to a root zone) so as not to cause the aforementioned issues.

Referring again to FIG. 1, one or more rolls 102 containing various amounts of film 104, such as about 3000 to about 5000 feet (914 m to 1524 m) of engineered polyethylene film are used. In one embodiment, the film 104 contains anywhere from zero to five (or more) small circular perforations of about 0.17 to about 0.25 inches in diameter per ft$^2$ (1.6 mm to 6.4 mm in diameter per 929 cm$^2$) and can be installed at any desired depth below a surface, such as on the order of millimeters (mm) below a surface, down to several meters, but not within the subsoil. In one embodiment, the film 104 is installed between about 2 and about 30 cm below a surface, including any range therebetween. In one embodiment, the film 104 is installed at least 30 cm up to about 60 cm, including any range therebetween. In one embodiment, the roll 102 is coupled to a BID (e.g., 400) proximate to the entry of the film folding, transfer and placement chamber (FTPC) (e.g., 113 in FIG. 1).

The film 104 can be folded into any suitable configuration, such as a u-shaped configuration, prior to and/or during transport to the interior region of the BID (e.g., 400) proximal the elongate chamber. In embodiments containing a chisel sweep 111 (FIG. 1), the configuration of the FTPC (e.g., 113) can open the film into a suitably shaped SRB, such as a bowl-shaped SRB, which is deposited into a medium that is preshaped in the same manner. In some embodiments, the film folding chamber 107 is external to the BID (e.g., 400) and passes through an upper surface of the chisel sweep 111.

In one embodiment, the contoured, bowl-shaped, base 119 of the chisel sweep (e.g., 111) can support lifting of the medium 118 over its outer surface. In one embodiment, this configuration reduces drawbar energy requirements as well as forms the desired shaped medium platform onto which the preformed SRB is applied (See FIG. 2). In one embodiment, the medium 118 (e.g., soil) falling off the back of the chisel sweep 111 falls upon the bowl-shaped SRB, allowing the SRB to be installed at the desired depth (See FIG. 2). Various aspect ratios of length to width to depth of the chisel sweep 111 combined with a shaping base 119 (e.g., a bowl-forming) include a 3 to 1 ratio of length to width of the chisel sweep 111 combined with an integral of the lift angle of the chisel sweep 111 from the front point of the chisel sweep 111 to the rear end.

In one embodiment, a process for installing SRBs via a film transfer and placement chamber (FTPC) is provided which includes an integrated chamber assembly, which in some embodiments is located directly behind a main cultivator standard of a chisel assembly. Energy for installing the SRBs can be developed by the forward motion of a forward moving device (e.g., self-powered vehicle, animal, animals, etc.) as it moves trough the soil. Any suitable amount of film can be dispensed at the beginning of the installation process to allow the film to engage with the medium at the desired depth. In one embodiment, about 1 to about 2 yards (0.9 to 1.8 m) is dispensed. In one embodiment, the depth of the installed film can be controlled by depth control wheels located at the surface and attached to any portion of the forwarding moving device, such as a drawbar. (See FIG. 11).

As the forward moving device moves forward, the external length of the film helps to pull the film through the FTPC at the same speed as the velocity of the forward moving device, such as a tractor. In one embodiment, at the end of each field pass, the chisel assembly can be raised as the forward moving device continues moving until the forward moving device is in position to install additional film as a subsequent barrier, at which time the chisel assembly can be lowered again.

The film can be installed at any suitable depth, such as about 3 to about 6 inches (7.6 cm to 15.2 cm) below a soil surface. In this way, the initial length of film, such as about 1 to 2 yards (0.9 to 1.8 m), establishes the flow of film during the next pass across the field. In one embodiment, as rolls of film are exhausted, the forward moving device can be stopped to allow a user to replace the exhausted roll with a new roll, with the end of the new roll and beginning of new roll spliced or fastened together secured by any suitable means, such as with double-sided adhesive tape, e.g., polyethylene tape, before continuing across the field. In one embodiment, the forward moving device has a power rating between about 35 and 50 HP (26 kW to 37 kW).

Figure 4:
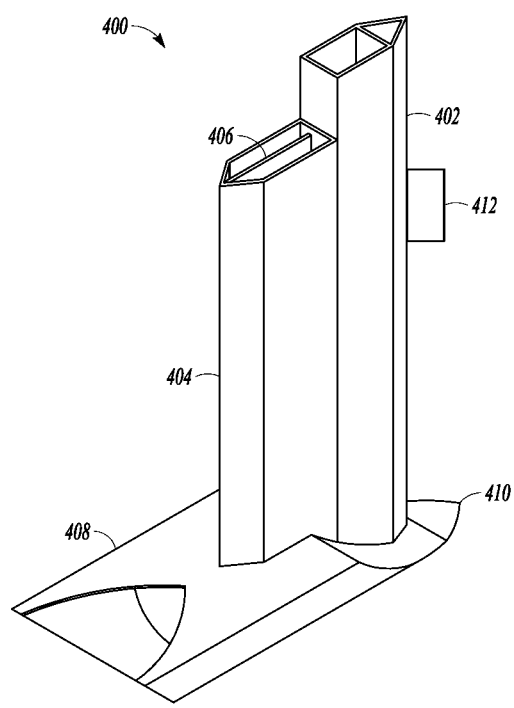
FIG. 4 is a perspective view of an alternative BID for installing a SRB, according to an embodiment.
Figure 5:
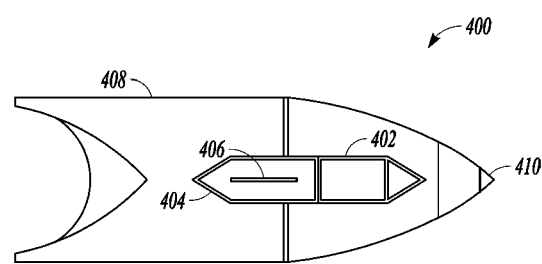
FIG. 5 is a top view of the BID of FIG. 4, according to an embodiment.
Figure 6:
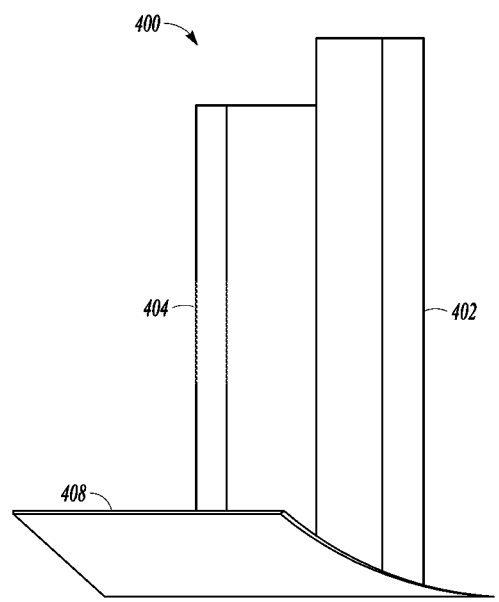
FIG. 6 is a side view of the BID of FIGS. 4 and 5, according to an embodiment.

FIGS. 4-6 show a perspective view, a top view, and a side view, respectively, of another alternative BID 400 according to various embodiments engineered to produce barriers having a width to depth ratio of at least 2:1 (as measured from the deepest portion of the barrier, i.e., at substantially the centerline of the barrier). The BID 400 includes a primary standard 402 connected to a BID implement frame 412, a film transport chamber 404, which includes an internal film folding area 406, and a pointed shoe 408 having a pointed tip 410.

The configuration the BID 400 is useful for achieving optimal results in a variety of soil types at a variety of depths and plant types. In one embodiment, an adjustable damper (not shown) connected to the BID 400 accurately controls the configuration and placement of the SWB. In some embodiments, the aspect ratio and/or configuration of the chisel assembly can be altered to reduce ground power for pulling through different soil types.

In one embodiment multiple BIDs (e.g., 400) are used. In one embodiment, two or more, such as 3, 4, 5 or 6 BIDs are attached to a drawbar (e.g., 704 in FIG. 7). In one embodiment, the BIDs are disposed in an arrangement in which deeper SRBs are installed 5 to 8 cm deeper than one or more shallow SRBs. In various embodiments, multiple BIDs are at offset depths to dispose multiple SRBs at different depths.

Figure 7A:
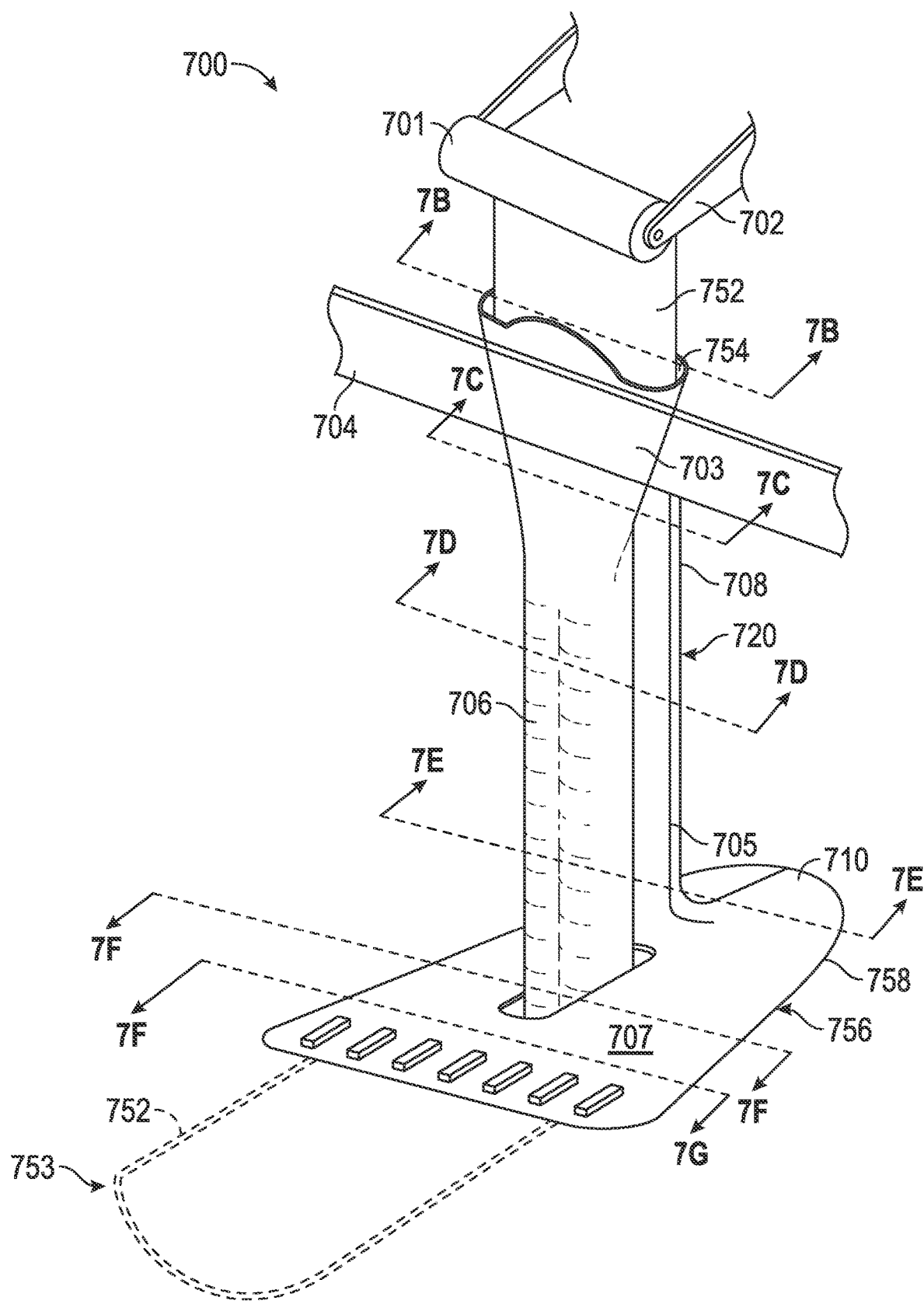
FIG. 7A is a perspective view of a BID for installing a SRB, according to an embodiment.
Figure 7B:
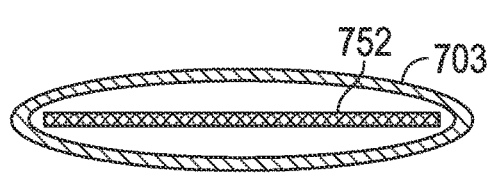
FIG. 7B is a cross section of the BID of FIG. 7A, taken along line 7B-7B.
Figure 7C:
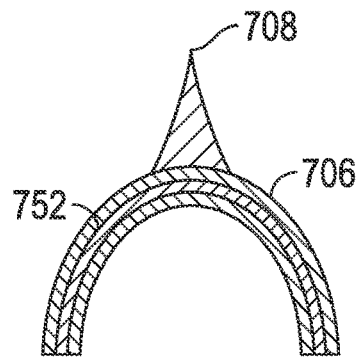
FIG. 7C is a cross section of the BID of FIG. 7A, taken along line 7C-7C.
Figure 7D:
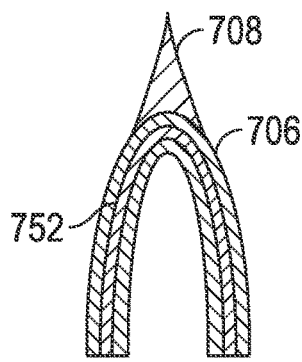
FIG. 7D is a cross section of the BID of FIG. 7A, taken along line 7D-7D.
Figure 7E:
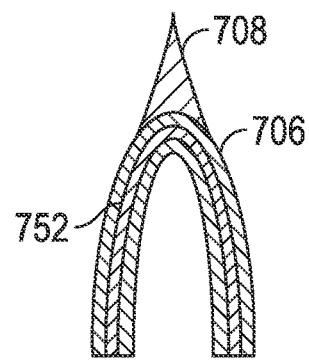
FIG. 7E is a cross section of the BID of FIG. 7A, taken along line 7E-7E.
Figure 7F:
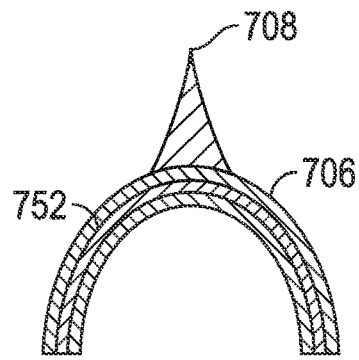
FIG. 7F is a cross section of the BID of FIG. 7A, taken along line 7F-7F.

FIG. 7A is a perspective view of an alternative BID 700 comprising a FTPC 703 attached to a drawbar 704 and a primary cultivator standard 705 having a chisel sweep 707 with an opening through which the FTPC 703 extends.

The BID 700 operates in a manner comparable to the BID 100 described in FIG. 1. In one embodiment, the BID 700 can install SRBs of any desired width, depth and length. The BID 700 can be inserted into a soil surface at the beginning and raised up at the end of each pass through the field. In one embodiment SRBs 753 of about 10 to 15 inches (25.4 to 38.1 cm) wide and 4 to 8 inches (10.2 to 20.3 cm) to about 12 inches (43 cm) wide and 6 inches (15 cm) deep can be installed. In one embodiment, the SRBs are installed at different depths (e.g., FIG. 9B) with the BID (e.g., 400) installing the deeper SRB in front of, or prior to, the shallower SRB.

In the embodiment shown in FIG. 7A, the BID 700 comprises a film roll 701 supported by a retainer 702 which retains, dispenses, and controls the length. In one embodiment, the film roll 701 is torque of film 752 of any length. In one embodiment, the film roll 701 between about 1000 m and 2000 m, such as about 1500 m, or 2,000 to 3,000 feet (609 m to 914 m) or about 1524 m (5000 ft) in length and about 14 to 18 inches (35 cm to 45 cm) in width. If longer continuous film rolls 701 are desired, the installation process is stopped and a new film roll 701 is added. In one embodiment, the film 752 has a thickness ranging from about 1-6 mils (25.4 μm to 152 μm).

In certain embodiments, the film 752 is loosely folded into a folded curvilinear pattern which, in one embodiment, is a folded cordate configuration. The film 752 is then transported to a cavity opening device 756 located at a bottom end of a BID (e.g., 200). In various embodiments, the SRBs are reopened in a butterfly fashion and pressed onto the concave-shaped soil cavity being formed below the chisel sweep 707. In one embodiment, the front surface of the main shaft 720 is a sharp arrow-head cutting surface 708, shaped to ease the opening of the vertical soil slit wide enough to protect a film folding and delivery channel 706, located directly behind and attached to the main shaft 720, which transfers the film 752 through the chisel sweep 707.

Various embodiments can include a perforation device to cut through the film 752 to discontinue installation at the end of each application pass in large fields. Film 752 can also be manually cut at the ends of the field and further trimmed to a desired depth below the soil surface, such as between about 15 and 25 cm, such as about 20 cm below the soil surface. The end of the new film roll 701 can overlap the end of the old film roll 701 by any suitable amount, such as between about 5 and 15 cm, such as about 10 cm. The film 752 can move through the FTPC 700 at any suitable speed. In one embodiment, the film 752 moves in a downwardly direction at about 1 to about 4 feet (30.5 to 121.9 cm), such as about 2 to about 3 feet (61 to 01.4 cm), such as about 2.3 feet (0.7 m) per second, for example, through the film channel 754. Some embodiments are dispensed at rates up to 4 feet per second (1.2 m/s).

The chisel sweep 707 can be any suitable size and shape. In one embodiment, the chisel sweep 707 is approximately 15 inches (38 cm) wide and 22 inches (56 cm) long. The chisel sweep 707 is designed to open an approximately 3 to 7 cm cavity of soil at a preselected depth. The chisel sweep 707 includes a cutting front edge tip 710 that forms a variable-shaped temporary soil cavity below chisel sweep 707 and a chisel sweep edge 758. The cutting front edge tip 710 lifts the soil to accept the film 752 being carried down behind a main shaft 720 of the primary cultivator standard 705 which guides the chisel sweep 707. In various embodiments, the chisel sweep 707 is equipped with exchangeable tips.

Any suitable primary cultivator standard 705 can be used. In one embodiment, the primary cultivator standard 705 is constructed of high-tension 2×9 inch (5.1×22.9 cm) channel steel containing a central cavity. In one embodiment, the primary cultivator standard 705 is about 40 inches (101 cm) long, welded onto the chisel sweep 707 and bolted to the drawbar 704.

Any suitable drawbar power can be used. In one embodiment, the drawbar power ranges from 30 to 75 horsepower (HP) per BID unit, depending upon soil texture, water content and depth of installation. In one embodiment, the BID is pulled by a vehicle at speeds of between about 3.2 to about 8 km/hr (2 to 5 mph), although the subject matter is not so limited. In one embodiment, the horsepower per BID unit is higher, such as greater than 75 HP up to about 100 HP. As the BID 700 moves through the soil, the chisel sweep 707 can develop a gap, such as a gap of about 5 to about 6 cm, between the undisturbed and the lifted soil. In one embodiment, the chisel sweep 707 has a front edge tip 710 which is concave and adapted to create a concave parabolic cavity to be filled with a SRB 753.

In one embodiment, the soil can be lifted about 3 to about 7 cm or more, such as about 5 cm, and transported along the top of the chisel sweep 707 and re-distributed as it is subjected to a flanged bed 708 located along the backend of the chisel sweep 707. The flanged bed can comprise, for example, vertically positioned metal bars welded on the top of the back end of the chisel sweep 707 to prepare the lifted and possibly compressed soil into smaller grains that cover of the SRB substantially uniformly. In this way, an array of broken soil materials are formed that fall on the newly formed SRB before the two sides of the SRB 753 are exposed to the falling soil, forming a substantially u-shaped SRB 753.

Some embodiments include SRB geometries for improved or maximized belowground water retention, storage and transfer. In certain embodiments, SRBs are installed in two cascade layers with lower layers of concave-shaped SRBs, overlapping the shadows of the above SRBs, such as by 2.5 cm. In various embodiments, the overlap is at prescribed depths. In certain embodiments, the overlap is created using multiple implements attached to the drawbar 704 similar to the deep tillage three-point implement drawbars available commercially.

In one embodiment, algorithms developed for the System Approach to Land Use Sustainability ("Salus") soil/crop/climate model can be used for strategically installing the SRB at a desired depth and spatial distribution at a site-specific location.

Figure 7G:
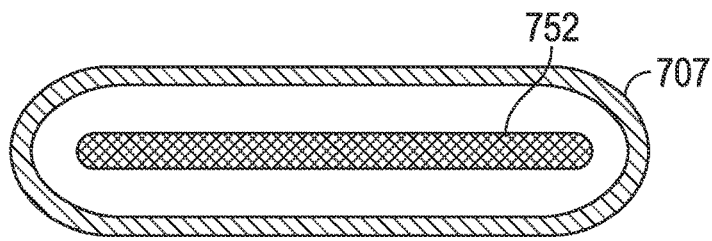
FIG. 7G is a cross section of the BID of FIG. 7A, taken along line 7G-7G.

FIGS. 7B-G are cross-sections of the BID of FIG. 7A taken along different lines of an example implement that is used to position SRBs, of various geometries, below a soil surface, each showing the film 752, the delivery channel, and, in FIGS. 7B-7F, the cutting surface 708 of the main shaft 720 of the primary cultivator standard 705. FIG. 7G, taken along line 7G-7G, shows the film 752 and the chisel sweep 707.

Figure 8:
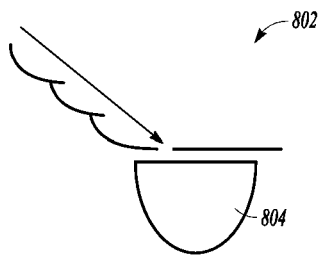
FIG. 8 is a schematic illustration of a water-harvesting configuration of a SRB for storing water in a belowground reservoir according to an embodiment.

FIG. 8 illustrates a series of SRBs in a configuration adapted to harvest and store water in belowground reservoirs. The SRBs can be installed as repeated dual layer cascades, or multiple "stair-step" cascades down hillsides as single layered SRBs running substantially perpendicular to the slope of the surface topography to maximize the retention and transport of small quantities of precipitation to underground reservoirs in arid regions. In one embodiment, the SRBs transport water down a slope 802 to a large underground reservoir 804. An underground reservoir 804 removes breeding grounds for insect vectors of human and animal diseases, e.g., malaria, dengue fever, elephantiasis, and the like, as well as plant diseases. In one embodiment, the SRBs are installed in artesian wells (not shown) in proximity to and beneath the underground reservoir 804. In one embodiment, any suitable type of water purification process is used in conjunction with the one or more SRBs.

In one embodiment, the medium is soil or a soil matrix and depth of SRB installation is determined by the texture of the medium. In one embodiment, the SRB depth is about 4 inches (10 cm) deeper than a maximum height of the capillary rise above a free water surface. The capillary rise can be determined by any suitable method. In one embodiment, capillary rise in various through recording water height in the plastic columns and measuring the difference of weight between dry and wet soil enables determination of water mass, bulk density, volumetric water content, and porosity.

In one embodiment, computer data that includes GPS reports of harvested crops during recent years, e.g., (past 3-5 years) is associated with topographic maps of fields for use with the SRB system. The result is used to determine patterns along which SRBs should be planted in at a crop site. In various embodiments, these data are incorporated into a GPS guidance system having high accuracy, such as within about 1 to 2 inches (2.5 cm to 5 cm). In one embodiment, the GPS guidance system is installed on a vehicle used to pull an implement containing more than one BID units, such as from 3 to 5 BID units. In some embodiments, an equipment item having 4 BID units is able to install 10 to 12 acres (4.05 to 4.86 hectares) per 8-hour day. Any suitable number of satellites can be used for the GPS guidance. In one embodiment, between about 7 and 12 satellites are used.

In one embodiment, the SRB is a non-biological flexible membrane (hereinafter "membrane") (e.g., artificial membrane, such as a polymeric membrane or liquid membrane) which can be installed at any desired depth below a surface, such as a soil surface. In one embodiment, the membrane is provided from a continuous source, such as a roll of material. In one embodiment, the membrane is a contoured engineered polyethylene membrane (CEPEM).

The SRB can have any suitable properties as desired for the particular application. In one embodiment, the SRB has a near-zero water permeation rate. In one embodiment, the SRB provides a soil-based prescriptive permeability in one direction and/or in select regions of the SRB. The SRB can be made with any suitable thickness depending on the particular application. In one embodiment, the SRB is impregnated with one or more inhibitors useful for resisting soil mesofaunal and root penetration.

The SRB can be a film or a film-forming liquid. In some embodiments, the SRB is formed of a polyformulated material, but the present subject matter is not so limited. Organic and inorganic polyformulated biodegraded materials are contemplated. In some embodiments, the film is formed as a preconfigured geometry of materials. Some of these materials include organic materials. In one embodiment, the SRB is formed, at least partially, of a polymer (e.g., polyethylene (PE)).

In one embodiment, the SRB is a film made, at least partially, from a high starch polymer. The high starch polymer can be partially or completely degradable in a natural environment and possess many desirable features of oil polymer plastic films, such as temperature resistance, durability and, in some embodiments, water resistance.

A high starch polymer film can be made using traditional plastic extrusion machines. In one embodiment, the high starch polymer film is made from a biodegradable high polymer polyvinyl alcohol ("PVOH"), such as a partially or completely biodegradable PVOH which is compatible with starch. In one embodiment, two ingredients are mixed with an optional elasticity enhancer and supplemental agent to improve the stability and durability of the products. In one embodiment, during the mixing and heating process, the starch molecular structures are randomized. The randomized starch molecules, the PVOH, the elasticity enhancer and the supplement can, in one embodiment, undergo a process of co-polymerization. In one embodiment, the mixture is extruded at a temperature above the crystallization temperature of the starch molecules to form a first stage product, such as pellets. In one embodiment, the pellets are extruded into films using a plastic film extruder. SRB embodiments provide a partially or completely biodegradable high starch polymer film as an alternative to oil polymer plastics.

The various ingredients of the high starch polymer can be combined in any suitable proportion. In one embodiment, the high starch polymer contains starch, PVOH and elasticity enhancer in the following weight distribution proportions:

| | |
|---|---|
| [a] Starch | 10-20 |
| [b] PVOH | 5-13.3 |
| [c] Elasticity Enhancer | 3.3-13.3 |

In a particular embodiment, the weight distribution proportion is:

| | |
|---|---|
| [a] Starch | 10-14 |
| [b] PVOH | 5.3-10 |
| [c] Elasticity Enhancer | 5-7.5 |

In some embodiments, an additional supplement agent may be used in the making of the high starch polymer. In one embodiment, the respective weight distribution proportion is:

| | |
|---|---|
| [a] Starch | 10-20 |
| [b] PVOH | 5-13.3 |
| [c] Elasticity Enhancer | 3.3-13.3 |
| [d] Supplement Agent | 0.3-2 |

In a particular embodiment, the optimal weight distribution proportion is:

| | |
|---|---|
| [a] Starch | 10-14 |
| [b] PVOH | 5.3-10.3 |
| [c] Elasticity Enhancer | 5-7.5 |
| [d] Supplement Agent | 0.5-1.5 |

The starch used in some embodiments contains greater than 20% of amylose, such as maize starch, chemically modified starch and oxidized starch, or a mixture thereof.

The degree of alcoholysis of the PVOH used in some embodiments varies according to the types of SRBs desired. In some embodiments, the PVOH with alcoholysis of 88% is used to produce SRBs that are water-soluble. The PVOH with alcoholysis less than 50% is used in some embodiments to produce SRBs that are not water-soluble. The optimal PVOH has a polymerization index of greater than about 1000.

The elasticity enhancer used in some embodiments is made of a mixture of polyols, polyglycol and water, with the respective weight distribution proportion of [10-18.6]:[2.9-8.6]:[5.7-14.3]. The optimal polyols are glycol, propanediol, glycerol or sorbitol. The optimal polyglycol has a molecule size of 200-600.

The supplement agent is made of polyvinyl alcohol (PVA), ethylene vinyl alcohol copolymer (EVOH), ethylene acrylic acid (EAA) and poly methyl methacrylate (PMMA). Their respective weights in percentage are PVA 20-30%, EVOH 18-29%, EAA 17-28% and PMMA 15-35%. The optimal percentage is PVA 23-28%, EVOH 21-25 &, EAA 21-26% and PMMA 22-28%.

The film can be any suitable thickness which allows the movement of the film during installation to occur at a resistance lower than the elasticity of the film. Thicker films create greater resistance and are more expensive. However, if the film is too thin, it may not hold up as desired. Generally, the more film surface area touching the steel of the BID as the film is moving through the device, the greater the resistance. In one embodiment, the BID is sized to allow the film to be transferred without bunching up or diverting to one side or the other of the channel in which it is traveling. In one embodiment, the film is between about 1.4 and 1.6 mm. In one embodiment, the film is no greater than about 1.5 mm.

The installed SRB can have any suitable shape. In some embodiments, the SRB is sized, shaped or otherwise adapted to improve soil water retention and other desirable features. Some embodiments are porous, but the present subject matter is not so limited. Some embodiments have a subterranean life in excess of 50 years. Advantageously, use of a pre-formed SRB as a SRB allows for easy positioning in situ without requiring elevated temperatures or specialized spray equipment. For instance, as a soil-displacing tool, such as a wedge-shaped chisel or plow, is moved through soil in a first direction, a translating cavity is continuously formed with a SRB unrolled and positioned therein. Subsequently, as the tool continues to move forward through the soil, the SRB-coated cavity is continuously closed by the free flow of the supported soil above the cavity.

The cavity can be any of several configurations. In one embodiment, the cavity is a pit opened to the atmosphere. In one embodiment, the cavity is an enclosed or partially enclosed subsurface cavity defined by medium disposed around the cavity such that the cavity does not partially or completely open to the medium surface. Accordingly, in one embodiment, the cavity can be tunnel-shaped and extends through the medium beneath the medium surface, i.e., closed from the atmosphere above the medium surface. In one embodiment, the cavity is partially tunnel-shaped such that a hole or slot extends between the medium surface and the cavity, with the hole or slot having hole or slot area, along a cross section parallel to the medium surface that is less than a cavity cross-section taken parallel to the medium surface.

In one embodiment, a water retention means is formed in situ at a preselected subsurface depth. In one embodiment, the SRBs establish an artificial water table and control the downward migration of water in porous soil, and also optionally control the upward migration of water in soil.

FIGS. 9A-E illustrate cross-sectional views of SRB configurations in various embodiments. The SRBs are within different soil textures and climates to artificially inhibit migration of water, nutrients and/or pesticides in those respective environments, according to some embodiments. One or more SRBs is installed at various soil depths and spatial patterns, which maintain improved or optimized site-specific hydropedological water regimes in plant rhizospheres without flooding the entire soil area, regardless of maximum or minimum precipitation events or irrigation rates. SRBs in some embodiments are about 80 cm below the soil in a pre-selected pattern, but other embodiments are possible, as set forth herein.

In one embodiment, the SRBs are configured in the form of u-shaped liners, which optionally are perforated and adapted to drain soil water contents below saturation levels, such as within about 3 to about 5 days. In one embodiment, the SRBs are configured in a stair-stepped configuration to prevent soil flooding during wet spring rainfall periods, while maximizing water holding capacities for greater soil water supplies during prolonged droughts (see, e.g., FIG. 10A), while minimizing anaerobic sites that promote the production of greenhouse gases. In some embodiments, the SRBs are spaced at various depths for maximum capillary supply capacities to root systems ranging from seedling to mature stages of plant growth. In one embodiment, this embodiment is about 70 to 75 cm, although the subject matter is not so limited.

In one embodiment, the SRBs can be positioned below the soil surface across entire lengths of large and small fields, at depths that supply adequate soil solutions to roots of seedling and mature plants by capillary rise. In one embodiment, the SRBs are positioned at multiple distances from each other at two or more depths across a field depending, in part, upon soil type and cropping system rotations (see, e.g., FIGS. 4 and 10A).

Figure 9A:
FIG. 9A is a cross-sectional view of a barrier configuration comprising a series of overlapping curvilinear barriers in contact with each other at multiple depths below a surface, which may be useful in shallow depths, such as depths of about 40 centimeters (CM) to about 50 cm, according to an embodiment.

FIG. 9A is a cross-sectional view of a SRB configuration comprising a series of overlapping curvilinear SRBs in contact with each other at multiple depths below a surface, which may be useful in shallow depths, such as depths of about 40 centimeters (cm) to about 50 cm. This SRB configuration provides high water retention capacities for use in paddy rice and lowland plantings in sandy soils. A plurality of SRBs of a first width includes SRBs that overlap one another and touch one another. For example, in a plan view, a first layer includes spaced apart SRBs, with spaces between them. A second layer of film layers of approximately the same width is disposed beneath the first layer and spans the spaces. In some cases the SRBs of the second layer extend across the spaces, beyond the spaces and are wider than the spaces. In some embodiments, each SRB of the second layer touches a SRB of the first layer.

Figure 9B:
FIG. 9B is a cross-sectional view of a series of overlapping (non-contacting) curvilinear barriers at multiple depths below a surface, which may be useful at depths deeper than the depths of the barrier configuration of FIG. 9A, such as depths of about 50 cm to about 80 cm, according to an embodiment.

FIG. 9B is a cross-sectional view of a series of overlapping (non-contacting) curvilinear SRBs at multiple depths below a surface, which may be useful at depths deeper than the depths of the SRB configuration of FIG. 9A, such as depths of about 50 cm to about 80 cm. This SRB configuration provides high water retention for upland plantings in sandy soils of arid regions. For example, in a plan view, a first layer includes spaced apart SRBs of a width, with spaces between them. A second layer includes SRBs of approximately the same width disposed beneath the first layer and spanning the spaces. In some cases the SRBs of the second layer extend exactly across the spaces and do not overlap with the SRBs of the first layer in the plan view. In some embodiments, each SRB of the first layer is spaced apart from the SRB of the second layer and does not touch it, allowing water to flow through the spaces and between the SRBs of the first layer and the second layer.

Figure 9C:
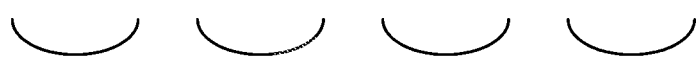
FIG. 9C is a cross-sectional view of a series of non-overlapping curvilinear barriers at substantially the same depth below a surface, which may be useful in finer textured soils at depths deeper than the depths of the barrier configuration of FIG. 9B, such as depths of about 80 cm or more according to an embodiment.

FIG. 9C is a cross-sectional view of a series of non-overlapping curvilinear SRBs at substantially the same depth below a surface, which may be useful at depths deeper than the depth of the SRB configuration of FIG. 9B, such as depths of about 80 cm or more. This SRB configuration provides high water retention for increased water retention capacities for upland plantings of row crops of finer textured soils in humid regions, according to some embodiments. For example, in a plan view, a first layer includes spaced apart SRBs, with spaces between them.

Figure 9D:
FIG. 9D is a cross-sectional view of a series of non-overlapping (non-contacting) curvilinear barriers in finer textured soils than FIG. 9B which retain less soil water at substantially the same depth below a surface, according to an embodiment.

FIG. 9D is a cross-sectional view of a series of non-overlapping (non-contacting) curvilinear SRBs at substantially the same depth below a surface. In various embodiments, SRBs arranged in this manner can be impermeable to water. In one embodiment, the SRBs are non-toxic, are not consumed by microbial or mesofaunal biota, nor decomposed within the wetness and darkness of the soil. In one embodiment, each SRB touches a SRB of the first layer. In one embodiment, SRBs are corrugated for humid to semi-arid regions with supplemental irrigation to compensate for excessive rainfall.

Figure 9E:
FIG. 9E is a cross-sectional view of a series of overlapping (contacting) curvilinear barriers at multiple depths below a surface, according to an embodiment.

FIG. 9E is a cross-sectional view of SRBs at multiple depths in an overlapping SRB configuration including a narrow SRB buried at a depth than the first and two wide SRBs buried at a shallower depth with the narrow SRB below a seam between the shallower wide SRBs. In this embodiment, therefore, a plurality of SRBs overlap one another and touch one another. For example, in a plan view, a first layer includes spaced apart SRBs, with spaces between them, and a second layer disposed beneath the first layer spans the spaces, and in some cases spans beyond the spaces. In one embodiment, the pattern of FIG. 9E is used in dry and precise supplemental irrigation regions.

Figure 10A:
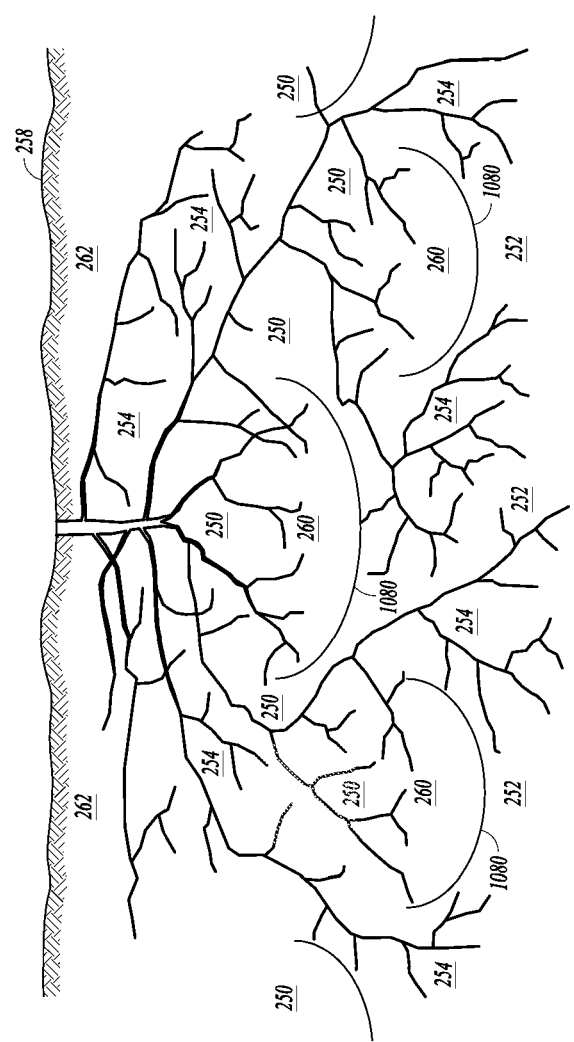
FIG. 10A is a cross-sectional view of a root zone containing a series of overlapping (non-contacting) curvilinear barriers at multiple depths below a surface, according to an embodiment.
Figure 10B:
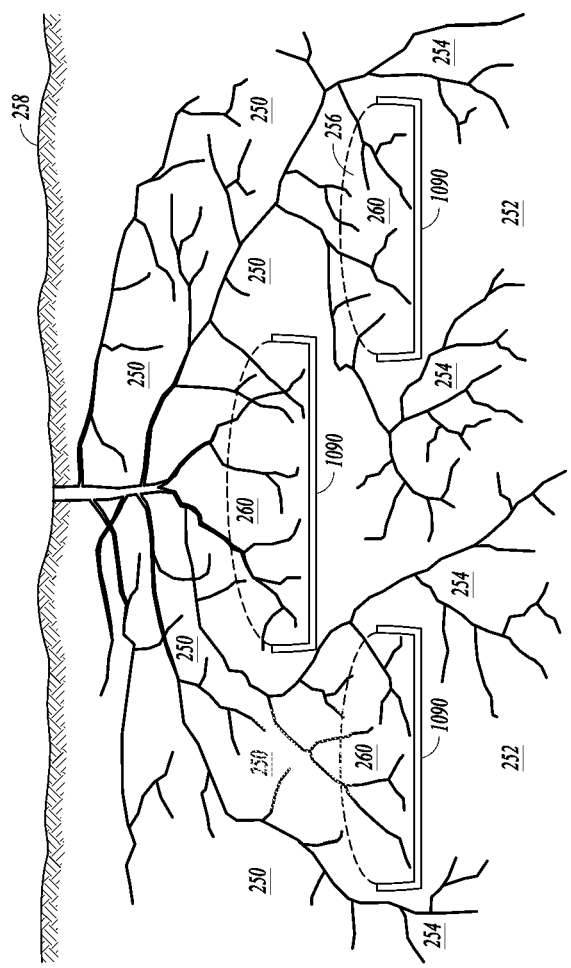
FIG. 10B is a cross-sectional view of a root zone containing a series of overlapping (non-contacting) squared-off u-shaped barriers at multiple depths below a surface.

FIGS. 10A and 10B provide schematic illustrations of possible SRB configurations in place under a soil surface. FIG. 10A is a cross-sectional view of a root zone containing a series of overlapping (non-contacting) curvilinear SRBs 1080 at multiple depths below a surface. FIG. 10B is a cross-sectional view of a root zone containing a series of overlapping (non-contacting) squared-off u-shaped SRBs 1090 at multiple depths below a surface, which, as noted below, does not function as well as the curvilinear SRB 1080 shown in FIG. 10A.

The SRBs 1080 in FIG. 10A are positioned below and between plant rows for roots to grow in soil areas retaining the highest water content 260, soils which are moist 254, and more natural well-drained soils having a lower water content 252 in a manner that provides adequate soil solutions rich in applied nutrients, such as in regions 260, 250, 254. Soil areas 258 and 262 represent the driest soil regions, which are the driest soil due to evaporation and plant root extraction. Soil area 260 represents the wettest soil in the root zone, retained directly above the SRB's 1080.

In the embodiment shown in FIG. 10A, the SRB's 1080 have a deep bowl shape, such that the ratio of the bowl width to a lowermost portion of the SRB 1080 taken at the centerline is no less than about 2:1, e.g., 12 inches to 6 inches (30 to 15 cm). As plants mature, roots growing in drier soil (252, 254) absorb more nutrients below the barriers in the soil profile. Production of $NO_2$ and $CH_3$ greenhouse gases are reduced by minimizing anoxic zones in the rhizospheres where water contents are properly controlled by the size and frequency of drainage pores in the SRBs.

Surprisingly, the curvilinear shaped barrier further retains the desired amount of water and nutrients, losing no more than about 5 to about 8% to wick out as a result of capillary rise of water from saturated or nearly saturated regions within the barrier. In one embodiment, the aspect ratio (width:height) is greater than about 4:1 up to about 1.5:1, such as between about 2.5:1 and about 1.5:1. In one embodiment, the aspect ratio is at least about 2:1. An aspect ratio in this range can retain desired quantities of water for reduced drought conditions, yet provide adequate drainage to nearby barriers which may be located above, below and/or on either side.

As noted herein, the spacing between barriers should not be too large or too small. In one embodiment, the range of spacings between is between about 5 to about 50% of the barrier heights, although the present subject matter is not so limited. For example, for a barrier having a width of about 12 inches (30.5 cm) and a height of about 6 inches (15.24 cm), barrier spacing can be 0.6 inches to about 3 inches (about 1.5 to about 7.6 cm). Such spacing can be adequate to increase plant yields by up to about 40% or more, such as up to about 50%. In one embodiment, green pepper and tomato yields are increased by about 40 to about 50%. The particular yield increase is also dependent on rain totals. In wetter than average growing seasons, the yield may be higher than during dry growing seasons.

FIG. 10B illustrates a configuration using SRBs 1090 that have a cross section shape of a parallelepiped with an open top. Locations of SRBs 1090 for water retention are diagrammatically presented in two layers at two different depths among plant roots in sandy soil regions containing different soil water contents. Sandy soils containing the highest, nearly saturated, soil water content, located at or near the surfaces of the SRBs 1090 (e.g., 20) are nearly anaerobic, yet aerobic among the 256 and 260. The most plant-available water is located directly above the SRBs 1090 (e.g., 250) and between the SRBs 1090 (e.g., 254). The driest soil regions are at the soil surface (e.g., 252) in the naturally drained sands below the zone of retention of SRBs 1090. In various embodiments, the SRB 1090 doubles water content in the soil.

Surprisingly, however, the square-shaped configuration (i.e., an angle of substantially 90 degrees between the floor and walls) of the SRBs in FIG. 10B do not work properly using the materials described herein. If the side walls are too high, they collapse (i.e., the square-shaped configuration cannot be maintained) and most of the retained water leaks out. If the sidewalls are too low, the SRB cannot hold sufficient water to affect plant growth. Additionally, capillary losses in the square-shaped SRB's add to the problems of this configuration. Tested square-shaped barriers started losing water immediately, with about 40% water lost within one hour and about 80 to 90% lost within one day.

In certain embodiments, the SRBs provide water retention at prescribed depths and configurations within sandy soil profiles in a pattern that alters the hydropedological water regime. Installed SRBrs can improve water use efficiencies by up to 20-fold, such as for food and cellulosic biomass crops planted in sandy soil. In one embodiment, the SRBs are adapted to bring marginally sandy soil into highly productive natural landscapes with substantial savings of water and fertilizer costs. The SRBs can also be used to confine and reduce deep leaching and groundwater contamination by agricultural chemicals and/or remove toxic chemical and biological wastes from municipal waste disposal and industrial sites to locations better suited for long-term, and/or by sorption, bioremediation and biodegradation.

In various embodiments, the depths and geometric configurations of the installed SRBs are uniformly spaced to improve the retention of controlled quantities of soil water, while providing controlled soil drainage following precipitation events, including unprecedented events. Various embodiments include SRBs buried at preselected depths for water retention. According to various embodiments, depths are based on, but not limited to, soil texture heights of water fringe above a SRB such as a barrier by capillary rise and median depths of plant root systems. In one embodiment, extended averages of precipitation frequencies and intensities are used. In one embodiment, 10 to 90 years averages are used, including any range there between. In one embodiment 30 to 50 yr averages are used, including any range there between. In some embodiments, site identification and depth of installation for the present SRBs is based upon the climate, depth of the sand in the soil profile, topology of the soil surface, the presence and depth of fine and coarse soil lenses or layers within the sand profile, the soil tillage (e.g., conventional or no tillage), fertilization rates, surface crop residues, crop rotations, pest control, pest control and/or the presence and use of high quality (e.g., low salinity) irrigation water.

At least one suitable approach for incorporating the above soil/plant/climate parameters into a decision for the SRB depth and sustainable management is identified by using a method such as the Salus soil/crop/climate method. Information input to such a method includes, but is not limited to, one or more of the following: multi-year (e.g., thirty-year) records of precipitation, water infiltration rate, wind speed, relative humidity, soil temperature, and solar radiation; soil types considered, e.g., texture, sand grain sizes, spatial variability and depths of internal soil lenses or narrow horizons of coarse and fine soil materials; soil depth to rocks or fine textured clay materials; soil and crop management practices, e.g., tillage, fertilization rates, crop rotations, and pest controls used; water management approaches, e.g., precipitation only, supplemental irrigation, or irrigation only (desert agriculture); types, frequencies and rates of irrigation used; plant rooting depths during the growing season for each crop in the rotation; and presence or absence of tree/crop agroforestry, e.g., types of trees, crop species, and adaptation.

Generally, for agricultural purposes, the SRB is installed sufficiently deep to permit surface soil cultivation without disturbing the SRB. However, the SRB should not be installed so deep that the roots of the plant will not be nourished by the water trapped or retained by such SRB. The depth of the SRB below the soil surface varies with the type of plant grown in the root zone. In various embodiments, the SRB is deep enough to reduce evaporation at the soil surface. In some embodiments, the SRB is placed about 20 to about 36 inches (51 cm to 91 cm) beneath the surface.

Water retention and distribution within the upper portion of the soil profile, such as about the upper 70 to 80 cm (e.g., at least about the upper 75 cm) of the soil profile is governed by the quantity of water at the SRB surface. Either natural precipitation and/or supplemental irrigation increase the soil water contents to near saturation. The gradients of plant-available water distributed within the sandy soil profile above the SRB are controlled by the capillary lift capacities by the pores within the sand above the SRB. Criteria for identifying the height of capillary water above a saturated zone are determined, in some cases, by sampling the natural soil to depths of about 20 to about 30 cm beyond the projected depth of SRB placement, such as at least about 25 cm.

In one embodiment, criteria are determined by retaining this soil in a transparent plastic cylinder that is inserted into a container of free water. The height to which the moist soil rises during a time period, such as between about 2 and 12 days, e.g., at least about 7 days) is the maximum height of the soil water supplied by the SRB. These data are incorporated into soil water absorption polynomial equations that identify the quantities of plant-available water at each soil depth above the SRB. The depth of one or more SRBs is adjusted to improve or maximize the quantity of water in the soil as controlled by subsequent additions of precipitation water. In one embodiment, water is controlled with irrigation, which is supplemental to precipitation.

The placement of the SRB can be determined by applying appropriate applications of soil sampling, such as the samples described herein. In one embodiment, the system is modeled before installation. Additionally, climatic conditions, such as 30-year climatic conditions, and soil capillary rise evaluations can be measured and reported by various soil scientists, local Cooperative Extension and/or USDA Conservation personnel in the United States or elsewhere. This data is further processed by the Salus model at a centralized computer facility, such as one connected to the Internet.

Installation depths of a SRB such as a SRB in sandy soil are inversely related to the primary pore radii in the soil. Depths for a SRB are calculated using the capillary rise equation that calculates the height (hr) of the capillary rise of water above the SRB. In one embodiment, the height (h) is equal to $(2\delta \cos \alpha)/g(\rho 1 - \rho g)r$ where "r" is the average radius of the pores filled with water which conduct the capillary water to the upper region of the capillary fringe and flowing over barriers having low to flat restricted flow barriers. In one embodiment, the upper region of the capillary fringe is at an average height of about 20 to about 40 cm above the free water surface of water retained by the SRB. Sandy soil containing about 59 to about 74% of the sand grain size fractions between about 0.1 and about 0.25 millimeter (mm) can have SRBs installed in depths of up to about 80 cm, for example. These sand fraction sizes vary approximately 10% with only a few cm difference in the net height of the capillary fringe, above the SRB.

In one embodiment, a method for positioning one or more SRBs is provided. This method can include, but is not limited to, categorizing medium types by measuring capillary rise from the soil. Once the soil type is categorized, a depth can be determined for disposition of a SRB. Thereafter, a look-up table of soil types can be provided for a SRB installation. The look-up table can be a hand-held table or stored on a machine. In one embodiment, a sensor measures capillary rise, and provides that data to an operator. The information containing capillary rise information can be communicated wirelessly from a sensor to the operator. In one embodiment, the operator is a machine and automatically correlates the capillary rise information to a look-up table to determine a suitable medium type.

Thereafter, a further table of information, such as a handheld table or a look-up table can be used to correlate medium type to a SRB installation depth, so that a SRB can be installed at a proper depth. Accordingly, in one embodiment, capillary rise information can be automatically correlated to medium type, which is automatically correlated to SRB installation depth, after which a signal can be provided to an automatic SRB-depth adjustment mechanism to select a SRB depth. In one embodiment, the SRB is installed at the selected SRB depth.

The various embodiments will be further described by reference to the following examples, which are offered to further illustrate various embodiments of the present invention. It should be understood, however, that many variations and modifications may be made while remaining within the scope of the present subject matter.

EXAMPLE 1

Testing the multiple influences of barrier installations in said soils was completed during the development of a preliminary BID prototype. Laboratory experiments and a large greenhouse lysimeter were performed to identify optimum depths, geometric configurations, spacings, surface and subsurface irrigation application rates and plant responses to the barriers.

Figure 12:
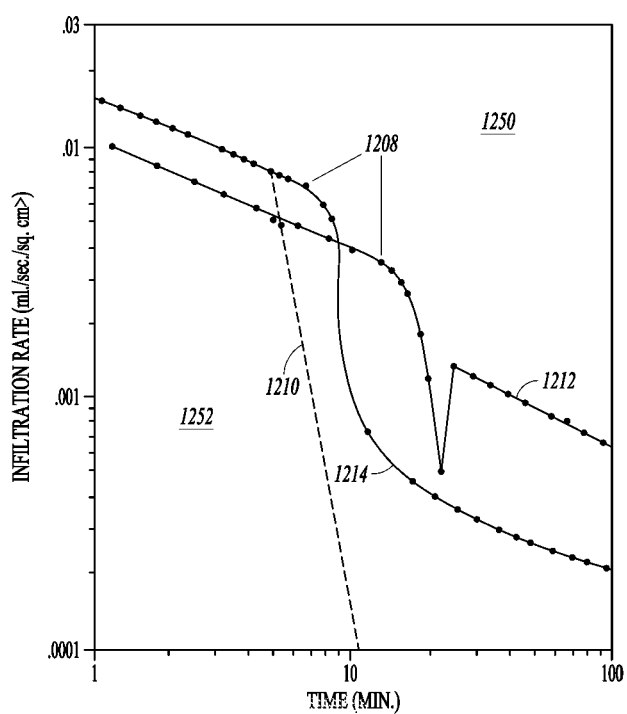
FIG. 12 shows water percolation graphs of a soil matrix with and without a barrier, according to carious embodiments.

Test results are shown in FIG. 12 where the water infiltration of a soil profile 1252 is reduced by a leaky clay water barrier 1214 in some sand soils. Additionally water infiltration in profile 1252 is reduced to near zero by an impermeable barrier such as polyethylene. The wetting front 1208 is depicted for the clay water barrier 1214 and a sand layer 1212. Configurations tested included a wetting front 1208 applied to the surface of a sandy soil profile 1250 had a water flux rate of about $9.66 \times 10^6$ liters per hectare per day. Infiltration in the same profile 1250 containing a clay layer 1214 was reduced to a water flux rate of about $1.93 \times 10^6$ liters per hectare per day. However, when a u-shaped polyethylene water barrier was placed in the same sand profile the water flux rate was reduced to about $0.05 \times 10^6$ liters per hectare per day.

These results confirm that installation of water barriers at prescribed depths and configurations can maximize water retention of water which can be delivered by capillary transport to the projected root zone without excessive evaporation at the soil surface.

Figure 13:
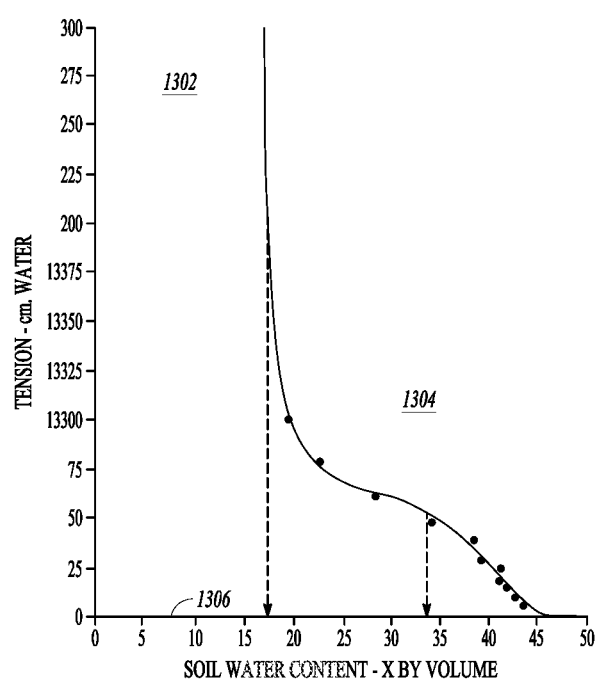
FIG. 13 is a graph showing the nearly 200% increase, 18 to 34% volumetric soil water content in the water retention capacities of the 25 to 50 cm of sand above SWB in contrast to the 10 to 12% volumetric soil water holding capacity of soils without SRB, according to various embodiments.

The soil characteristic water retention graph in FIG. 13 is an example that can be used to predict volumetric soil water retention that approximates 34% in a fine sand when a water barrier 1304 is placed at a depth of 50 cm while only 17% can be retained by this fine sand without a barrier 1302. A datum 1306 represents 7% volumetric water content at the plant permanent wilting point.

These results show that barriers placed at 50 cm store about 34% water which becomes more available to plant roots with minimal evaporative losses at the soil surface.

EXAMPLE 2

Figure 14:
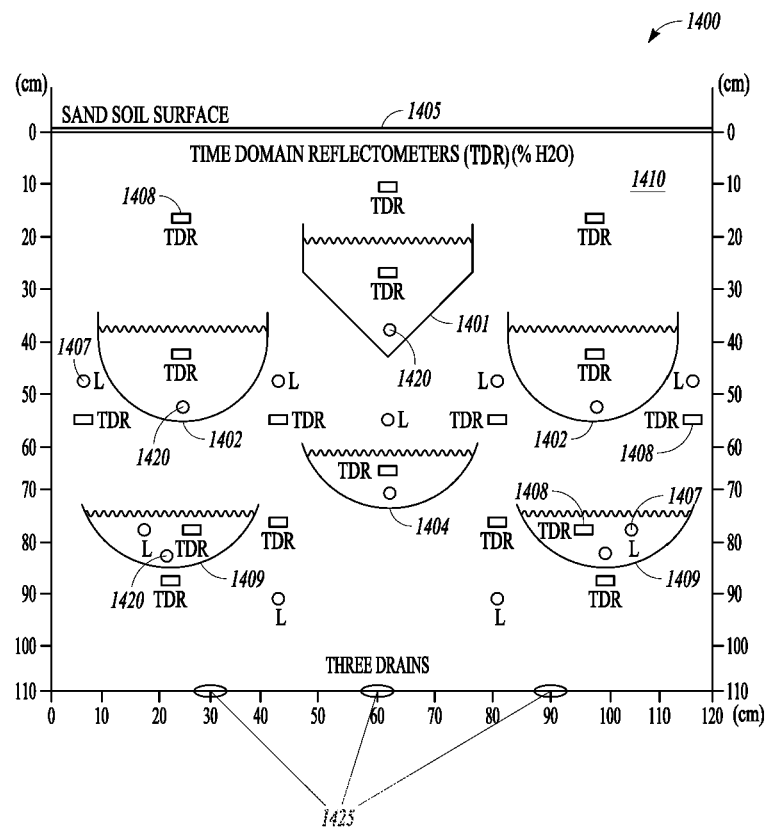
FIG. 14 is a diagram of the multiple depths and XYZ positions of water barriers having different geomorphic configurations within a coarse textured sand volume equipped with multiple time domain reflectrometer and temperature probes (TDR) and soil solution sampler lysimeters (L) according to various embodiments.

To further test plant responses to the presence of water barriers having multiple configurations and installed at multiple depths in a large lysimeter 1400 as shown in FIG. 14. The lysimeter 1400 was 120×110×150 cm in length and was constructed in-house with polyethylene. The lysimeter 1400 was filled with River Run™ brand medium fine sand 1410 (River Run Products Corp.) which had a soil surface 1405. The barriers were manually installed, from end to end, e.g., 150 cm, with their ends brought to the soil surface to eliminate loss of stored water, during the construction of the sand lysimeter 1400. Specifically, one V-shaped barrier 1402 at a depth of approximately 27 cm, two u-shaped barriers 1402 at a depth of approximately 42 cm and one shallow concave-shaped barrier 1404 at 67 cm. The two bottom barriers, 1409 were perforated for limited drainage within the lysimeter 1400 as shown in FIG. 14.

Subsurface irrigation tubes 1420 were placed on the bottom regions inside each water barrier configuration (1401, 1402, 1404 and 1409) and were equally distributed throughout the soil 1410. Volumetric soil water contents and temperature were continuously monitored by Decagon 5TE probes 1408 in 49 replicated locations (not all shown), within and between barriers 1401, 1402, 1404 and 1409. Continuous soil water and temperature measurements were monitored by Decagon EM 50 data loggers.

Figure 15:
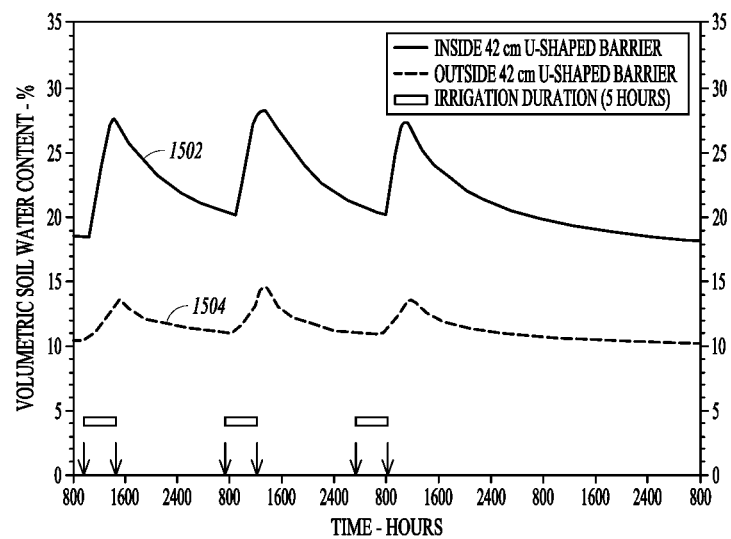
FIG. 15 shows maximum soil water holding capacity measured at multiple depths both inside and outside SRBs as compared with a control according to carious embodiments.
Figure 16:
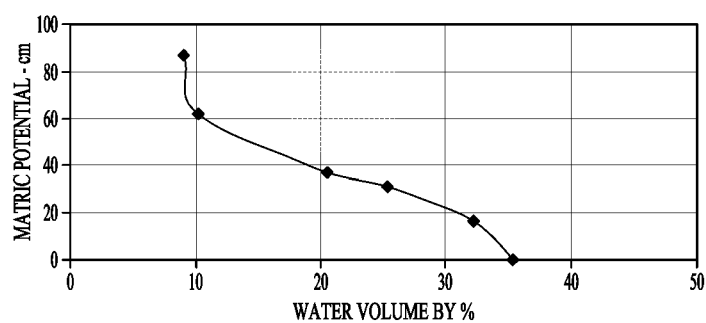
FIG. 16 is a soil moisture retention characteristic curve showing how greater matric potential (cm) on water bodies within sand dramatically reduces the retention of soil water volume percentage according to an embodiment.

Equilibrium soil water retention values inside the un-shaped barriers 1502 (at 42 cm depths) having an aspect ratio or width to depth ratio of about 2:1 approximated 200% more water than was retained in the control sand outside the barriers as shown in 1504 of FIG. 15 and as predicted by the soil water retention graph for the medium coarse sand as shown in FIG. 16. In contrast, due to greater capillary flow losses the V-shaped barrier 1401 (at 27 cm depths) retained only 80% more water than the control sand without barriers and drained within minutes. Additionally, the shallow concave-shaped barrier 1404 retained only 10% more water than was retained in the control sand. The barriers used herein are curvilinear.

Twenty-four small suction lysimeters 1407 were also distributed in replicated locations throughout the large sand lysimeters 1400 to extract soil solution for nutrient evaluations, roots beneath the soil surface, root demographics and numbers were video recorded using a microvideo camera (Bartz Technology, Carpenteria, Calif.) along 48 in (120 cm) of three clear plexiglass minirhizotron (MR) tubes (not shown), installed 5.5 in (14 cm) beneath the soil surface 1405. Numbers of living roots for each of these subsoil positions were counted above and between specific barriers.

Figure 17:
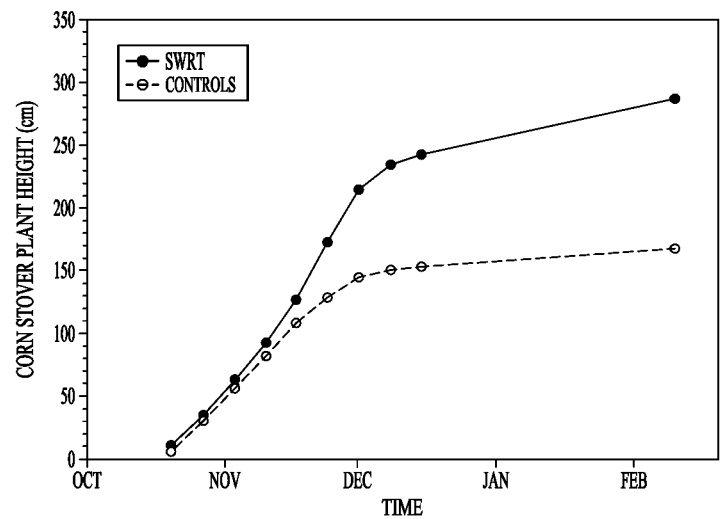
FIG. 17 is a graph showing the accentuated corn stover height achieved when WRBs are placed at 25 and nearly 50 cm depths in sand.
Figure 18:
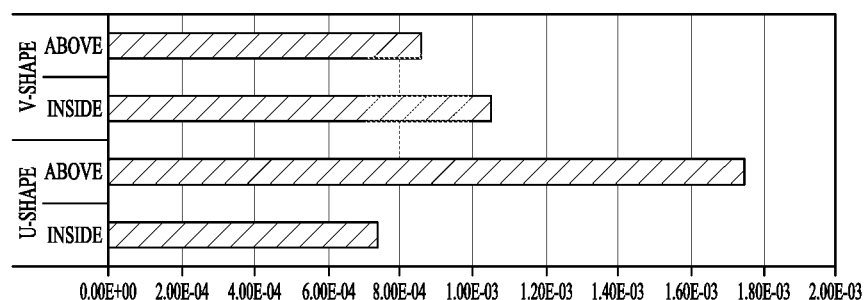
FIG. 18 is a bar graph showing slower average water diffusivity to plant roots above and inside a V-shaped barrier than above and inside a u-shaped barrier according to various embodiments.

Corn was planted at high populations in the lysimeter 1400 to identify biomass produced per water added and retained at both shallow and deeper regions of their root zones. Greater water availability to the root zones of corn plants growing over barriers enhanced corn plant growth beginning at week three and approximated 200% greater plant growth during the crop season (See FIG. 17). This greater plant growth in sands with water barriers increased corn stover production at calculated rates of up to 10,400 Kg/ha (24 tons per acre) of cellulosic biomass as shown in FIG. 21.

Drainage was measured by collecting water loss at drains 1425 located at the bottom of the lysimeter 1400 as shown in FIG. 14. Complete water balance measurements which included evapotranspiration from plant leaves and the soil surface 1405 was identified by the difference between irrigation and drainage.

Initial plant responses to subsurface water barriers (1401, 1402, 1404 and 1409) included corn plants planted at population densities 5.6-fold greater than field grown corn. Plant stover growth (cm height), leaf area (cm$^2$, root density (cm/gm), soil water contents (%) and water use efficiency (mm/g) were monitored during the 16 weeks of controlled irrigation in the Plant Science Department greenhouse located at Michigan State University, East Lansing, Mich.

Subsequently tomato seedlings were planted at populations 3-fold greater than field grown tomato plants. Details of above and below ground responses to barriers are reported in Example 3, below.

EXAMPLE 3

Identification of Soil Water Saving Barrier Controls of Plant Root Growth by Modifying Soil Water Diffusivities Tomato plants grown in the lysimeter 1400 described in Example 2 were used to obtain essential plant responses to additional soil water data for best barrier placements. The plants were irrigated three times a day at rates of 25 liters per minute, for one minute in the early morning, for two minutes about 13 hrs later, and for one minute about 7 hrs later. Barrier placements (1401, 1402, 1404 and 1409) in the lysimeter 1400 as shown in FIG. 14 identify specific XYZ locations of multiple levels of soil water altered by barrier retention or gravitational drainage when barriers are absent. Approximately 200% more water was retained and available to the tomato roots growing above barriers than without barriers.

Saturated and unsaturated soil water flux rates (q), to the roots were calculated by Darcy's equation, below, and were proportional to the water content and hydraulic gradient. The hydraulic conductivity is controlled by the distances among the different soil volumetric water contents defined by the matric potential ($\Delta\Psi/\Delta x$) of the volumetric soil water content ($\theta_v$) and distance from the water retained by the barrier, as shown in FIGS. 15 and 16.

$$q = K(\theta v)\frac{\partial \psi}{\partial x}$$

The specific water capacity, $C(\theta_v)$, below, was calculated using the changes in the soil matric water potential ($\Psi$) from the graph in FIG. 16, enables the derivation of water diffusivity, $D(\theta_v)$, by the formulas, below:

$$C(\theta v) = \frac{d\theta v}{d\psi}$$

$$D(\theta v) = \frac{K(\theta v)}{C(\theta v)}$$

Figure 19:
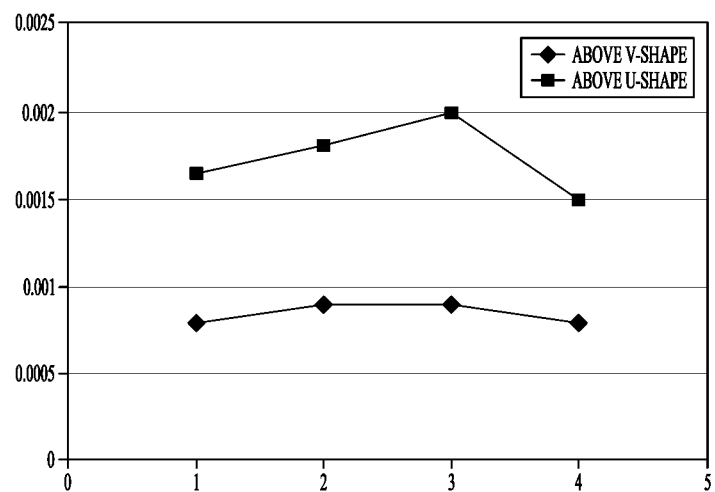
FIG. 19 is a graph showing slower water diffusivity to roots above a V-shaped barrier as compared to a u-shaped barrier according to various embodiments.
Figure 20:
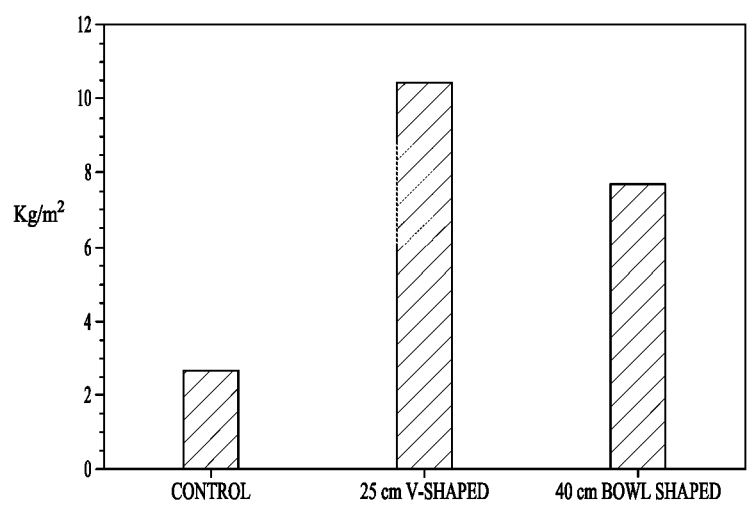
FIG. 20 is a bar graph showing biomass production by corn stover grown for 104 days due to the combined water and nutrient retention capacities of both shallow V-shaped SRB and a deeper 40-cm bowl-shaped retention barrier as compared to a control without barriers according to various embodiments.

Once root numbers of the tomato plants are known per volume of soil water flux rates were determinable. As the results show, flux rates of water from the u-shaped barriers 1402 were 138% higher than the V-shaped barrier 1401 as shown in FIGS. 19 and 20. These high quantities of water provided by the u-shaped barriers 1402 caused a 28% reduction in the number of roots required by tomato plants than those plants growing over the V-shaped barrier 1401.

EXAMPLE 4

Field Installation of a Subsurface Retention Barrier (SRB)

Figure 11:
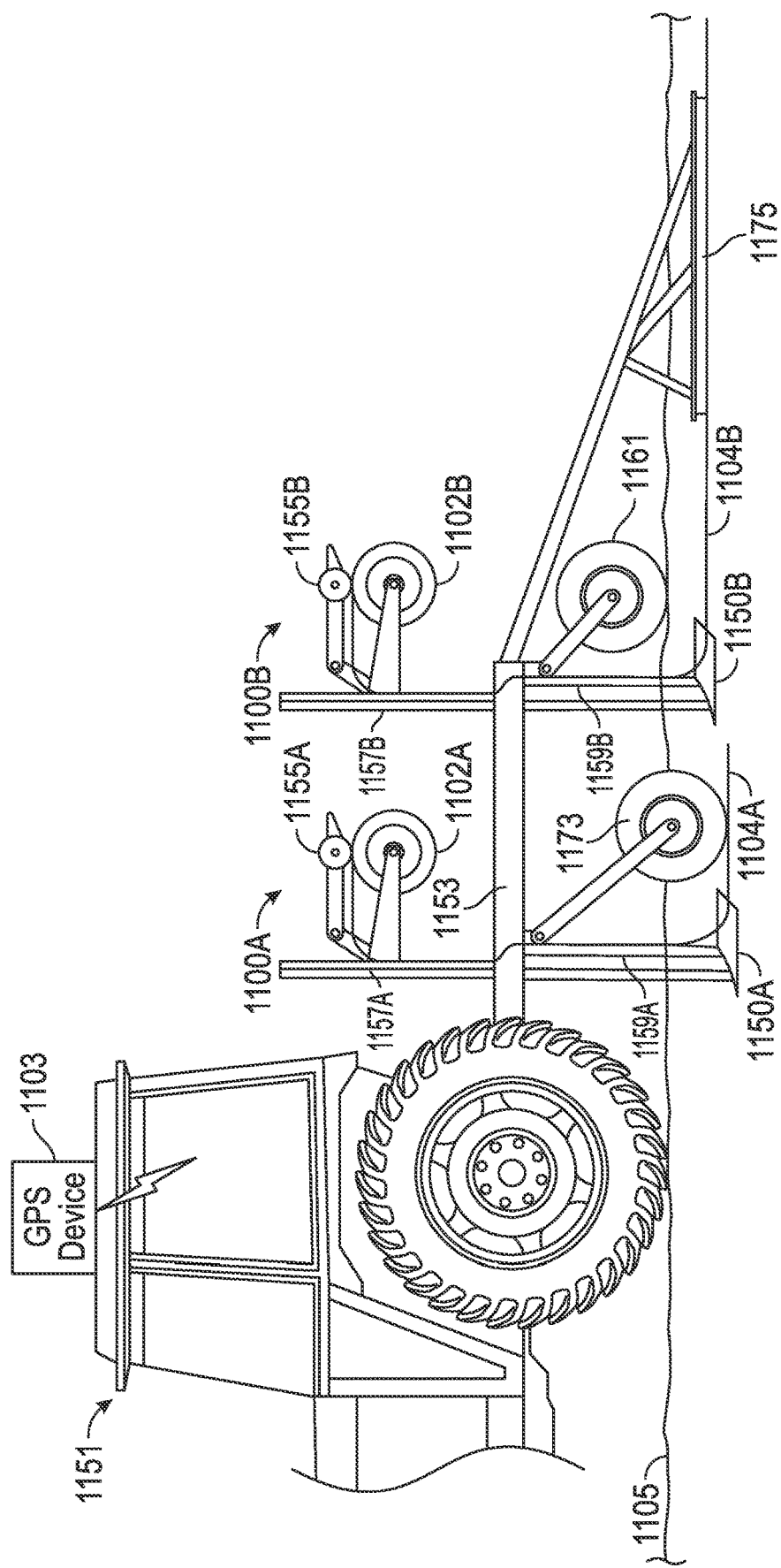
FIG. 11 is a side view of a BID installed on a tractor according to an embodiment.

Testing was completed on a Spinks fine sand near Benton Harbor, Mich., on a pepper and tomato field containing SRB having a width to depth ratio of 2:1, 12 to 6 in, (30 to 15 cm) installed at a single depth of 14 in (36 cm) at spacings of approximately 1 inch (2.5 cm). With reference to FIG. 11, two BIDs 1100A and 1100B were pulled through the Spinks sand by a tractor 1151 (John Deere Model 8350, 350 HP) fully equipped with a satellite-based guidance system (Trimble AgGPS Field Level II guidance system, http://www.trimble.com/news/releases.aspx) via the BID implement frame 1153 connected to the tractor's (1151) 3-point hitch. Depth of the SRB was adjusted with the satellite-based guidance system via hydraulics located on the tractor 1151 and also by depth control wheels, e.g., 116) connected to each of the BIDs 1100A and 1100B. In this particular testing, the depth control wheels 1161 were located at the rear of the BIDs 1100A and 1100B.

Each roll of bio-degradable 2 mil polyethylene film (Brentwood Plastics, St. Louis, Mo.), 1104A and 1104B was between about 2,000 and 5,000 feet (600 to 1500 m) and was 18 inches (40 cm) wide. The rolls 1104A and 1104B were restrained by a saddle carrier spring connection (not shown) (Andros Engineering Corporation, Santa Margarita, Calif.) secured to each film's respective breaking wheel, 1155A and 1155B. Resistance for each of the rolls of film, 1104A and 1104B, was controlled by tire pressure in the respective breaking wheels, 1155A and 1155B. In this way, uniform rotary resistance was maintained as the films, 1104A and 1104B, passed down through and out the back of the respective pointed shoe, 1150A and 1150B.

In use, each film 1104A and 1104B, traveled down and into their respective BID pointed shoes, 1150A and 1150B within their respective film transfer chamber 1159A and 1159B. The transfer chambers 1159A and 1159B were located behind their respective primary standard, 1157A and 1157B, of each BID, namely 1100A and 1100B, respectively. The bottom of each film transfer chamber, 1159A and 1159B, was contoured at an angle of about 45 degrees, connecting each film transfer chamber, 1159A and 1159B to its respective u-shaped placement chamber (See e.g., 110 in FIG. 1) located inside each BID pointed shoe, 1150A and 1150B. In this way, each of the films 1104A and 1104B were laid open within their respective chambers, 1159A and 1159B, before being delivered to the formed soil. The turning portion of each BID, 1100A and 1100B, had sufficiently low torque resistance, such that abrasion was minimized, preventing the films, 1104A and 1104B, from moving to one side, as they otherwise would.

Each film, 1104A and 1104B, exited the u-shaped exit at the back of each of the pointed shoes 1150A and 1150B (i.e., at the non-pointed end or back side) as a u-shaped film, 1104A and 1104B, at the desired depth. Two depth control wheels 1161 (one shown) connected to the back of each BID implement frame 1153, in combination with the hydraulic controls of the tractor, allowed the user to select and accurately control the desired depth of the two BID units 1100A and 1100B.

The tractor 1151 also provided the power source used to pull the BIDs 1150A and 1150B through the soil. The pointed shoes, 1150A and 1150B opened the soil, formed a firm soil base onto which the barriers were placed by temporarily removing soil, and covered the SRBs formed by the films 1104A and 1104B with the temporarily removed soil. The BID shoe points (e.g., 410 in FIG. 4) were drawn through the soil to identify soil interactions between the two adjacent BID units 1100A and 1100B and to install one SRB 1104, BID units 1100A and 1100B.

The depth of the installed barrier varied depending on sand texture and rooting depths. The SRBs formed by films 1104A and 1104B were installed in the Spinks sand at depths of about 14 in (36 cm) and spaced approximately 2 in (5 cm) apart.

The Trimble AgGPS Field Level II guidance system 1103 in communication with the hydraulic controls of the tractor 1151 and the depth of the control wheels 1161 at the back of the BID implement frame, 1153, was used for controlling and confirming soil depth (z) and directional path (x,y) of the barriers with 0.5 in (1.3 cm) accuracy. Manual excavations to the barrier surfaces provided accurate placements of 12 in (30.5 cm) wide barrier installations at depths of 14 inches (36 cm) from base to soil surface. The internal barrier depth was determined to be about 6 in. (15.2 cm) at the center line.

One row of tomato and two rows of pepper seedlings were transplanted during the beginning of the growing season into beds, 50 feet (15 meters) in length, which were covered with surface plastic containing holes for plant spacings. Surface drip irrigation was applied to both barrier and control areas for three weeks until the seedlings were well established. No further supplemental irrigation was added.

During most of the summer, water content in the root zones of these plants containing one level of the barriers shown in FIG. 14 was approximately 40% greater above the barriers as compared to water content in the root zones of plants without a barrier.

Although the 2011 harvest of peppers and tomatoes continues, preliminary yields indicate greater quantities of the highest quality of peppers and tomatoes are being produced on sands with barriers containing the highest soil water contents. Higher quality harvests of these two crops indicate the novel systems provided herein will likely increase profits for farmers.

EXAMPLE 5 (PROPHETIC)

Additional testing will be performed to determine how the barriers can most effectively aid plant growth in order to maximize their potential. For example, knowledge of diffusivity data as compared to plant height data can aid in predicting specific volumes of water that will be useful for different amounts of plant growth, to minimize the amount of water wasted in growing crops. Additional variables can be considered to determine the most efficient shape and placement of barriers.

Other testing will involve the continued monitoring of plants, such as the tomato plants (e.g., Burpee's Table Ready variety) in the lysimeter until they are harvested, as well as testing of barriers on production of grain and cellulosic biomass in additional field sites. Other aspects of plant growth can be considered in future testing, such as water use efficiencies of conventional and bioengineered genotypes with emphasis on leaf size or root patterns. Physical properties of a barrier's interactions with a medium, such as soil or a soil matrix, can be further investigated to determine the causes behind patterns observed in the completed testing to provide more specific information for optimizing the effects. Additional testing will include pulling up to four BID shoes through the soil simultaneously. Two layers of barriers, as shown in FIG. 10A, installed at 60 cm, are expected to approximately double or triple soil water holding capacities in sand soils without water retention barriers.

Other field testing may include installing barriers at more than one depth, such as at two or more depths, as discussed herein.

Yet other testing will include deeper SRBs having a width of about 12 in. (30 cm), located about 6 in. (15 cm) deeper, directly below gaps between adjacent shallower SRBs.

CONCLUSION

Plant water deficits are among the greatest limitations for maximum plant growth potential. Water supplies and the safety of waterways in close proximity with state and international boundaries are facing a national crisis. In addition to dwindling surface water, large cities struggle daily with inadequate water supplies and related issues while populations soar, local food supplies shrink, and water for agricultural production becomes more expensive.

The subsurface water retention technology (SWRT) described herein provides, for the first time, a water saving system comprising a barrier implement device for installing a barrier to provide long-term reversal of water and nutrient losses from the root zones of plants growing in sandy soils. See, for example, FIG. 10A. By installing barriers, such as thin polymer films, thin natural clay horizons found in most productive sandy fields can be simulated. The barrier implement device (BID) can accurately place film at strategic depths below a surface to create a barrier or a series of barriers in a variety of configurations. This technology can provide improvements in food and fiber production and soil quality by catching and saving each drop of water where it falls.

The subsurface retention barrier (SRB) systems described herein also have the potential to reduce excessive use of water resources for agricultural purposes by allowing a more equal distribution of water to larger amounts of land, thus slowing the process of desertification. These systems can also lessen nutrient leaching by improving soil moisture retention in the root zone. Such systems can also enable plants to more efficiently attain water and nutrients from rhizosphere soil. By preventing the quick drainage of water through soil, the novel systems described herein increase the volume of water readily available for absorption by roots. With greater soil water content, plants require fewer numbers of roots to attain an adequate amount of water, so less of the plants' energy is used for root growth and more energy can be used for above ground plant growth. Retention of nutrients can additionally be achieved.

The various device for installing SRBs include a horizontal barrier installation machine and a vertical barrier installation machine. In one embodiment, the installation equipment also installs irrigation pipeline concurrent to the installation of the barrier. In one embodiment, as a SRB is installed, a pipeline can be installed in the concavity of the barrier, such that water from the pipeline is collected and retained by the SRB.

In one embodiment, the novel system described herein is a GPS-enabled system which allows each pass of the BID to be properly interfaced with the preceding pass. If the pass is too wide, the previous barrier can be drained. If too narrow, the previously installed barriers can be disrupted. In one embodiment, the GPS system provides accuracy to within no less than about 1.5 cm in the x and y directions. In one embodiment, the GPS device can be located on a suitable support device external to the BID.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

Although specific embodiments have been illustrated and described herein, it will be appreciated by those of ordinary skill in the art that any procedure that is calculated to achieve the same purpose may be substituted for the specific embodiments shown. This application is intended to cover any adaptations or variations of the present subject matter. For instance, the subject matter disclosed herein can also be used to form effective subsurface barriers in roads built over plastic subgrades having constant moisture content and thereby prevent upward intrusion of water through capillarity into the road bed. Similarly, the subject matter can be used to provide barrier protection for canals, irrigation ditches, bodies of water (e.g., ponds, lakes), and the like, to prevent water losses. Therefore, it is manifestly intended that embodiments of this invention be limited only by the claims and the equivalents thereof.

What is claimed is:

1. A curvilinear subsurface retention barrier system comprising:
   a series of curvilinear barriers, each having a curvilinear cross sectional profile and located within a region of soil located above a subsoil at a preselected depth having a vertical accuracy (z) to within less than three (3) cm, wherein the preselected depth is both sufficiently shallow to be located above a subsoil and sufficiently deep to be located beneath expected lower most roots in projected root zones of plants, wherein the vertical accuracy (z) of the preselected depth provides adequate space for expected lower most roots and allows excess water to bypass the barrier system, wherein the preselected depth also prevents anaerobic conditions from developing over time, wherein each of said barriers is further located in a horizontal location having a horizontal accuracy (x,y), wherein the vertical accuracy (z) of the preselected depth and the horizontal accuracy (x,y) of the horizontal location maximize functionality of said barrier system and allow said barrier system to collect and retain water and nutrients at levels appropriate for the plants above, wherein each of said barriers in the barrier system are also spaced sufficiently far apart from one another to maximize overall barrier system functionality, wherein the horizontal location is determined, at least in part, by one or more wireless positioning systems in combination with crop data comprising at least two of precipitation records, water infiltration rate, wind speed, relative humidity, soil temperature, solar radiation, soil type, soil and crop management practices, water management, or plant rooting depths and the preselected depth of the curvilinear barriers are determined, at least in part, by at least two of said crop data.

2. The system of claim 1, wherein at least one of the curvilinear barriers is located at a deeper preselected depth than at least one other curvilinear barrier in the series and/or at least two of the series of curvilinear barriers are adjacent to one another and/or at least two of the series of curvilinear barriers are in contact with one another.

3. The system of claim 2, wherein the curvilinear subsurface retention barriers are provided at multiple preselected depths above the subsoil and overlap with one other.

4. The system of claim 3, wherein the curvilinear subsurface retention barriers are provided at multiple preselected depth above the subsoil and are in contact with one another.

5. The system of claim 2, wherein the curvilinear subsurface retention barriers are provided at multiple preselected depth above the subsoil and are in contact with one another.

6. The system of claim 2 wherein the curvilinear barriers are provided at multiple preselected depth (z) locations, and the curvilinear barriers located at shallower preselected (z) locations are wider than the curvilinear barriers located at deeper preselected depth.

7. The system of claim 1, wherein each curvilinear subsurface retention barrier has a u-shaped configuration which is a concave parabolic shape, a bowl shape, or a contoured shape.

8. The system of claim 1, wherein at least one of the curvilinear subsurface retention barriers has a width to height ratio of about 4:1 or greater.

9. The system of claim 1, wherein at least one of the curvilinear subsurface retention barriers has a width to height ratio of about 1.5:1 to about 2.5:1.

10. The system of claim 1 wherein each barrier is made from inorganic or organic polyformulated biodegraded materials.

11. The system of claim 1 wherein each barrier is made from a polymer-based film.

12. The system of claim 11 wherein the polymer-based film is a polyethylene film.

13. The system of claim 11 wherein the polymer-based film is a high starch polymer film made from a partially or completely biodegradable high polymer polyvinyl alcohol (PVOH).

14. The system of claim 13 wherein the high starch polymer film also contains a supplemental agent selected from polyvinyl alcohol (PVA), ethylene vinyl alcohol copolymer (EVOH), ethylene acrylic acid (EAA), poly methyl methacrylate (PMMA), and combinations thereof.

15. The system of claim 14 wherein the high starch polymer film also contains an elasticity enhancer comprising a mixture of polyols, polyglycol and water.

16. The system of claim 1 wherein each of the barriers has a thickness ranging from about 1 to about 6 mils.

17. The system of claim 1 wherein at least one of the barriers contains a plurality of substantially circular perforations each having a diameter from about 0.17 to about 0.25 inches.

18. The system of claim 1 wherein the vertical accuracy (z) is accurate to within less than one (1) and is located from about 2 to about 80 cm beneath a surface of the soil.

19. The system of claim 1 wherein each of the preselected depths are also determined by a physical positioning system.

20. The system of claim 1 wherein the preselected depth for at least one barrier is determined, at least in part, on capillary rise information based on topsoil type.

21. The system of claim 20 wherein the capillary rise information is provided wirelessly to an operator positioning said barrier.

22. The system of claim 20 wherein no more than about 5 to about 8% of water wicks out as a result of capillary rise of the water from within each barrier.

23. The system of claim 1 wherein the subsurface is within a topsoil.

24. The system of claim 1 wherein the soil comprises a permeable mineral soil comprising an Oxisol, an Alfasol, a sandy soil, or combinations thereof.

25. The system of claim 1 wherein at least one of said wireless positioning systems further includes a laser system.

26. The system of claim 1 wherein the vertical accuracy (z) of the preselected depth allows said barrier system to maintain a soil-oxygen diffusion rate of $24 \times 10^{-8}$ g cm$^{-2}$ min$^{-1}$ or greater, and wherein about 180% to about 300% more water is retained in the projected root zones as compared to projected root zones not having said barrier system.

27. A method comprising:
installing a curvilinear subsurface retention barrier system, wherein the system comprises a series of curvilinear barriers, each having a curvilinear cross sectional profile and located within a region of soil located above a subsoil at a preselected depth having a vertical accuracy (z) to within less than three (3) cm, wherein the preselected depth is both sufficiently shallow to be located above a subsoil and sufficiently deep to be located beneath expected lower most roots in projected root zones of plants, wherein the vertical accuracy (z) of the preselected depth provides adequate space for expected lower most roots and allows excess water to bypass the barrier system, wherein the preselected depth also prevents anaerobic conditions from developing over time, wherein each of said barriers is further located in a horizontal location having a horizontal accuracy (x,y), wherein the vertical accuracy (z) of the preselected depth and the horizontal accuracy (x,y) of the horizontal location maximize functionality of said barrier system and allow said barrier system to collect and retain water and nutrients at levels appropriate for the plants above, wherein each of said barriers in the barrier system are also spaced sufficiently far apart from one another to maximize overall barrier system functionality, wherein the horizontal location is determined, at least in part, by one or more wireless positioning systems in combination with crop data comprising at least two of precipitation records, water infiltration rate, wind speed, relative humidity, soil temperature, solar radiation, soil type, soil and crop management practices, water management, or plant rooting depths and the preselected depth of the curvilinear barriers are determined, at least in part, by at least two of said crop data.

* * * * *

UNITED STATES PATENT AND TRADEMARK OFFICE
CERTIFICATE OF CORRECTION

PATENT NO. : 10,561,082 B2  
APPLICATION NO. : 15/460196  
DATED : February 18, 2020  
INVENTOR(S) : Alvin J. M. Smucker Page 1 of 1

It is certified that error appears in the above-identified patent and that said Letters Patent is hereby corrected as shown below:

In the Specification

Column 4, Lines 20-21: delete "to carious embodiments" and insert --to various embodiments--

Column 4, Line 35: delete "to carious embodiments" and insert --to various embodiments--

Column 15, Line 54: delete "two cascade layers" and insert --two cascading layers--

Column 23, Line 15: delete "at least about 7 days)" and insert --at least about 7 days,--

Column 24, Lines 61-62: delete "multiple configurations and installed" and insert --multiple configurations, water barriers were installed--

Column 26, Line 64: delete "2:1, 12 to 6 in, (30 to 15 cm)" and insert --2:1, i.e., 12 to 6 in (30 to 15 cm)--

Column 27, Line 8: delete "wheels, e.g., 116)" and insert --wheels (e.g., 116)--

Signed and Sealed this  
Twelfth Day of May, 2020

Andrei Iancu  
*Director of the United States Patent and Trademark Office*